(12) United States Patent
Fairchild et al.

(10) Patent No.: US 11,318,561 B1
(45) Date of Patent: May 3, 2022

(54) LASER SURFACE MELTING FOR OUTGASSING REDUCTION

(71) Applicant: Government of the United States, as Represented by the Secretary of the Air Force, Wright-Patterson AFB, OH (US)

(72) Inventors: Steven B Fairchild, Beavercreek, OH (US); Daniel P Gortat, Cambridge (GB); William O'Neill, Cambridge (GB); Martin R Sparkes, Cambridge (GB)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 526 days.

(21) Appl. No.: 16/006,917

(22) Filed: Jun. 13, 2018

Related U.S. Application Data

(60) Provisional application No. 62/519,208, filed on Jun. 14, 2017.

(51) Int. Cl.
  *B23K 26/354* (2014.01)
  *C21D 1/34* (2006.01)
  *C22F 1/00* (2006.01)

(52) U.S. Cl.
  CPC .............. *B23K 26/354* (2015.10); *C21D 1/34* (2013.01); *C22F 1/00* (2013.01)

(58) Field of Classification Search
  CPC ... B23K 26/354; B23K 26/356; B23K 26/359
  See application file for complete search history.

(56) References Cited

U.S. PATENT DOCUMENTS 4,686,128 A  *  8/1987 Gentilman ............... B32B 3/30
                                                    428/44

6,294,219 B1     9/2001 Tsai et al.
                (Continued)

FOREIGN PATENT DOCUMENTS

KR     1020070056750 A    4/2007

OTHER PUBLICATIONS

Williams et al. "Prebreakdown and characteristics of stainless steel electrodes in vacuum" (Year: 1974).*

(Continued)

*Primary Examiner* — Alexandra M Moore
(74) *Attorney, Agent, or Firm* — AFMCLO/JAZ; Timothy M. Barlow

(57) ABSTRACT

A method for reducing outgassing from a metal surface comprises applying energy from an energy source to the metal surface sufficient to melt the metal surface; and allowing the metal surface to re-solidify, wherein the re-solidified metal surface comprises larger grains and fewer grain boundaries, reducing outgassing sites for a trapped gas. Applying energy from an energy source is performed in a raster scan pattern. Adjacent passes in the raster scan pattern overlap sufficiently to melt the entire metal surface. The energy source is a laser, such as a CW Yb fiber laser. A spot size and applied energy of the laser energy source applied to the metal surface is sufficient to melt the entire metal surface (appropriate for the absorption and reflection characteristics of the treated material). The application of energy from an energy source releases at least some of a gas trapped in the metal. The trapped gas is atomic hydrogen. The metal surface comprises an electrode of a high power system device. The metal surface is in one of a high-vacuum environment and a vacuum electronic device. The metal surface comprises at least one of steel, stainless steel, nickel, and copper.

5 Claims, 27 Drawing Sheets
(21 of 27 Drawing Sheet(s) Filed in Color)

Less trapped hydrogen

(56) References Cited

U.S. PATENT DOCUMENTS

| | | | | |
|---|---|---|---|---|
| 6,856,634 B2* | 2/2005 | Mikame | ............ | B23K 26/0613 |
| | | | | 372/1 |
| 7,297,419 B2* | 11/2007 | Watanabe | ................ | C22F 1/02 |
| | | | | 428/698 |
| 7,385,157 B2* | 6/2008 | Oda | .................. | B23K 26/0853 |
| | | | | 219/121.64 |
| 7,723,643 B2* | 5/2010 | Hackel | ................ | B23K 26/356 |
| | | | | 219/121.85 |
| 2005/0109954 A1 | 5/2005 | Herbst et al. | | |

OTHER PUBLICATIONS

Park et al. "Thermal outgassing rates of low-carbon steels" (Year: 2015).*

Gortat et al. "Laser surface melting of stainless steel anodes for reduced hydrogen outgassing" (Year: 2016).*

Chang et al. "Surface quality, microstructure, and mechanical properties of the SKD 61 tool steel with prior heat treatment affected by single- and double-pass continuous wave laser polishing" (Year: 2017).*

"Mechanics of the Selective Laser Raster-Scanning Surface Interaction". J.A. Ramos and D.L. Bourell. http://utw10945.utweb.utexas.edu/Manuscripts/2003/2003-54-Ramos.pdf (Year: 2003).*

Baboian, Robert. (2016). NACE Corrosion Engineer's Reference Book (4th Edition)—10.19 Austenitic Stainless Steels—Composition, %. NACE International. Retrieved from https://app.knovel.com/hotlink/pdf/id:kt0113ZRU4/nace-corrosion-engineers/nace-corro-austenitic (Year: 2016).*

Likhanskii, V., Dynamics of the egress of gas microbubbles from a melt under laser irradiation of a metal surface, Quantum Electronics, 30 (9), pp. 827-832, 2000.

Tsay, L., Reduction of hydrogen embiilllement in an ultra-high-strength steel by laser surface annealing, Fatigue, Fract. Engng Mater. Struct., 23, pp. 325-333, 2000.

* cited by examiner

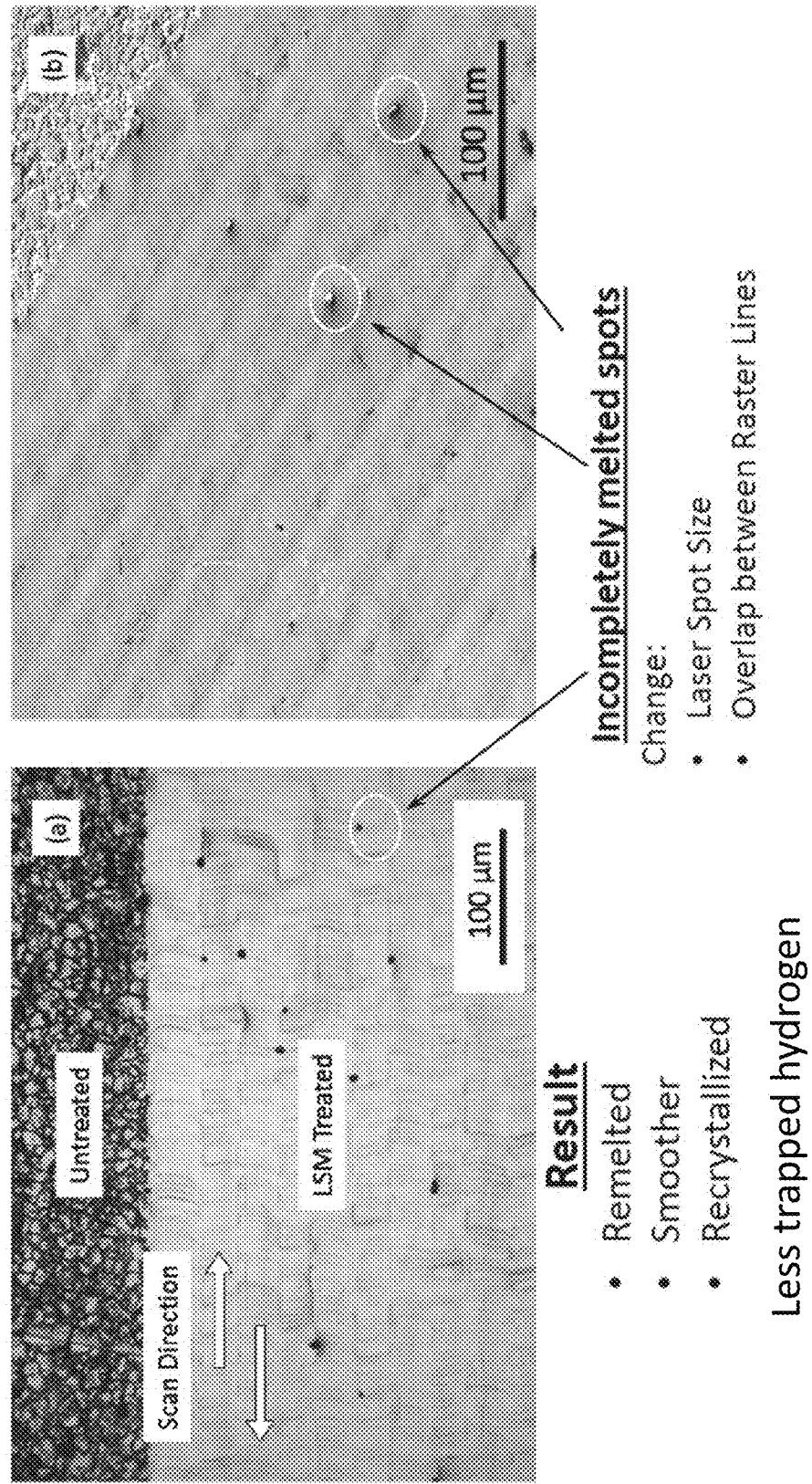

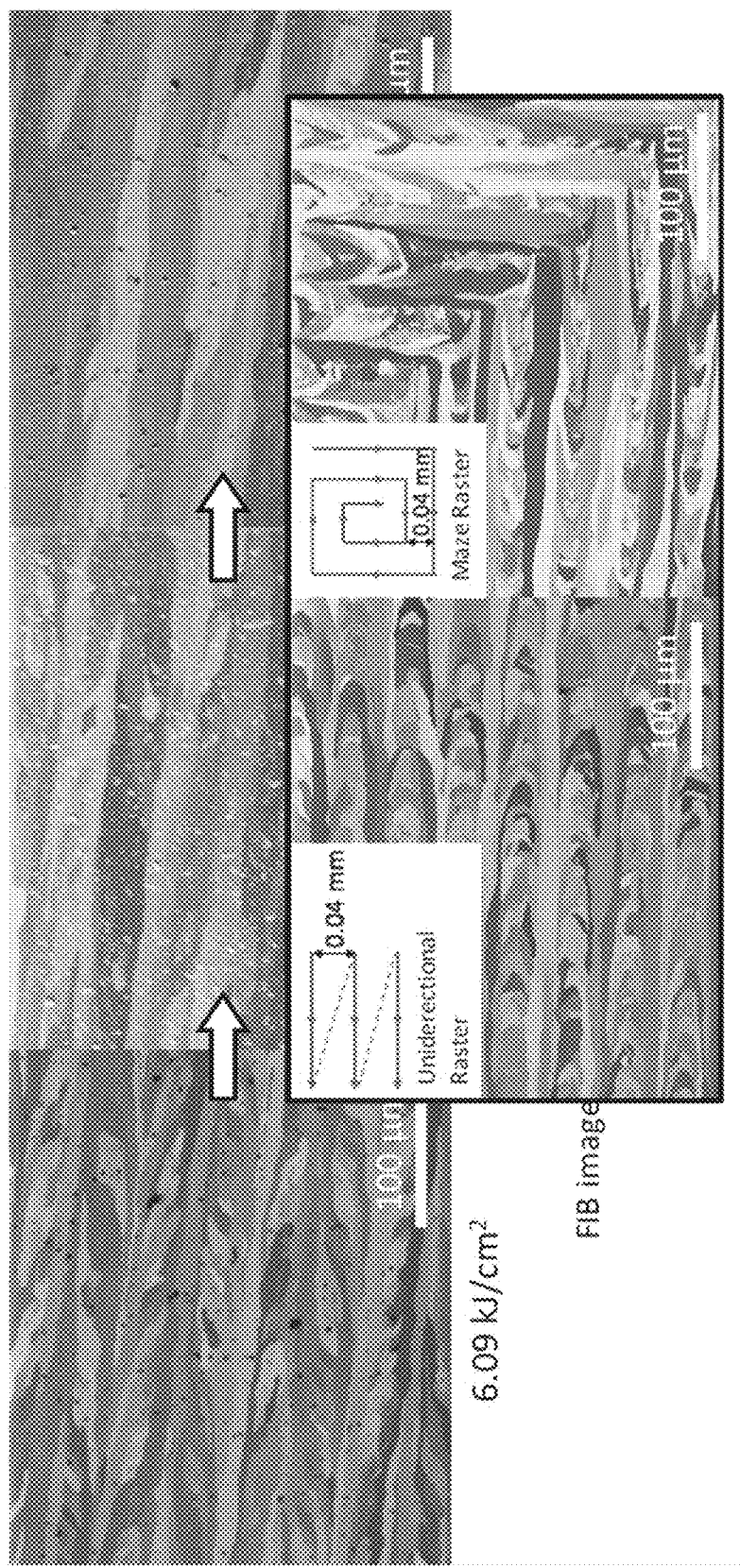

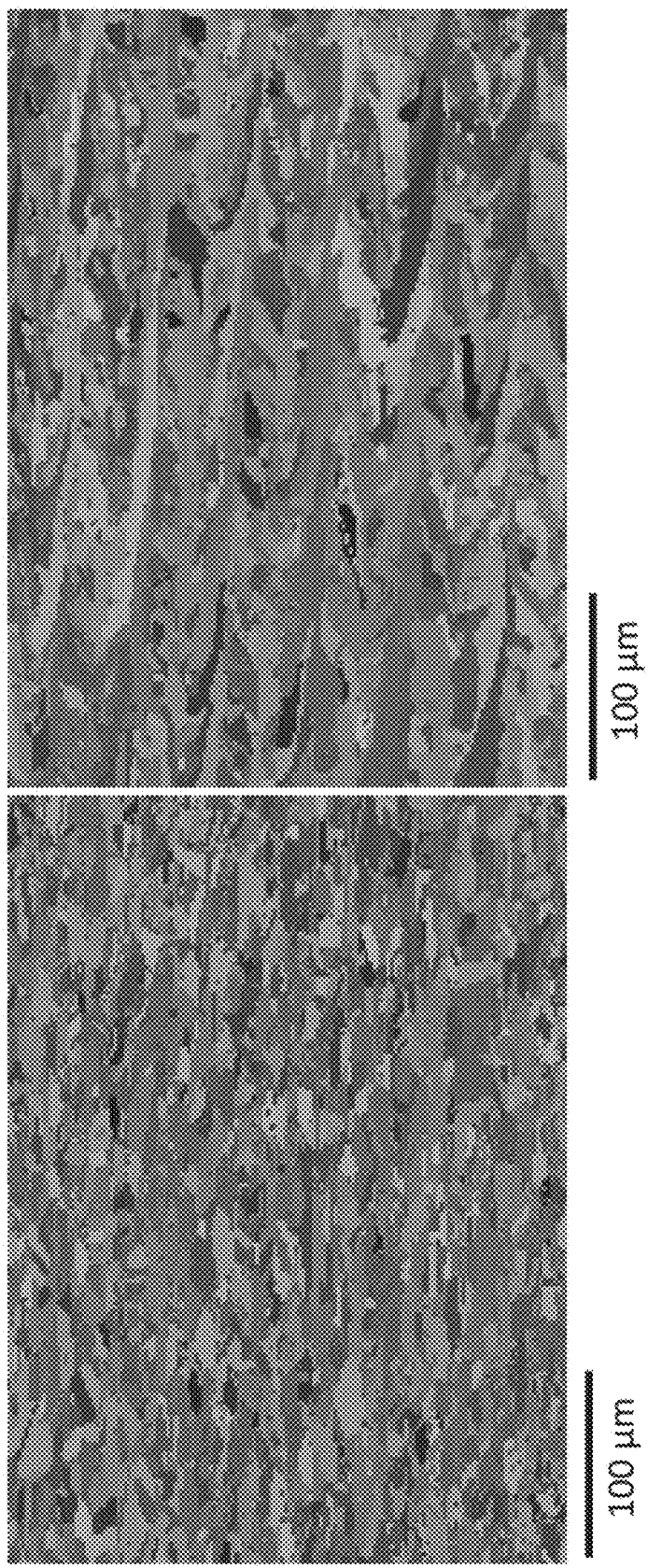

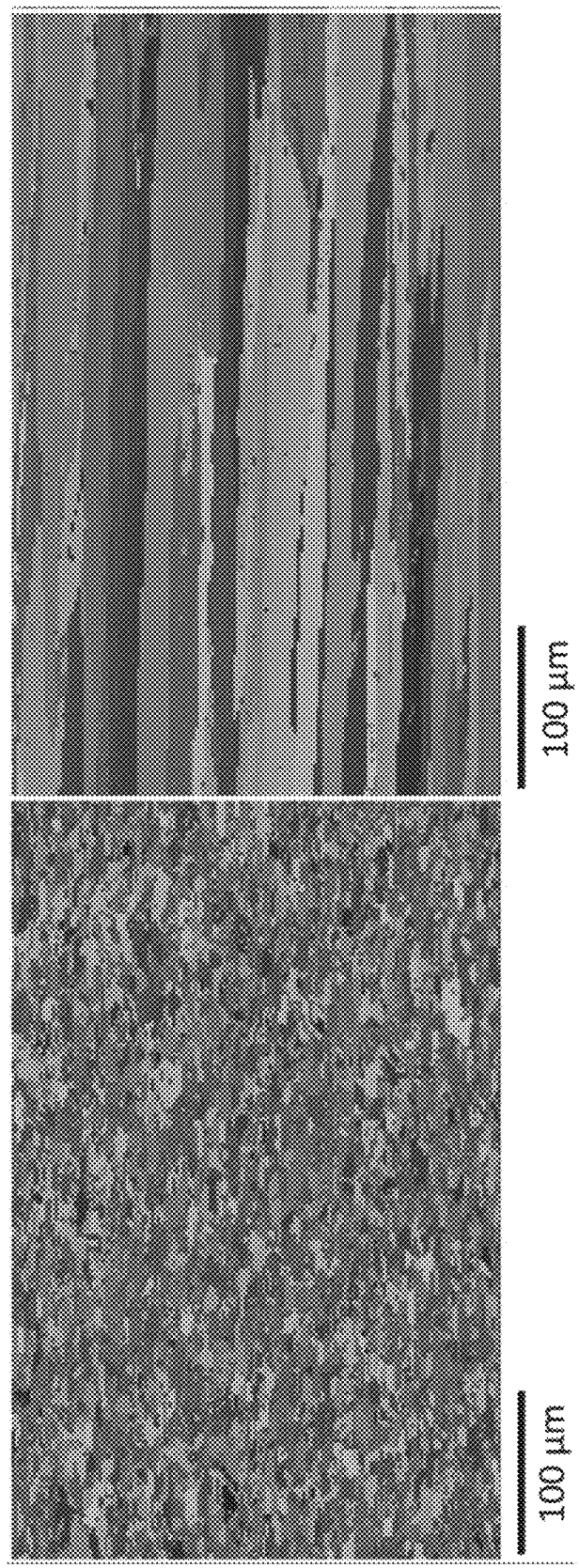

Electron bombardment for the 304 SS sample.

LASER SURFACE MELTING FOR OUTGASSING REDUCTION

Pursuant to 37 C.F.R. § 1.78(a)(4), this application claims the benefit of and priority to prior filed Provisional Application Ser. No. 62/519,208, filed 14 Jun. 2017, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to metal outgassing and, more particularly, to methods for reducing outgassing from metals.

BACKGROUND OF THE INVENTION

Vacuum electronic devices (VEDs) are used in numerous applications including high power RF amplifiers, particle accelerators, and both x-ray and microwave generators. In particular for high pulsed power applications, stable, long term VED operation can be constrained by pulse shortening due to plasma formation in the anode-cathode gap region. Plasma is formed through the interaction of secondary electrons and gas molecules both of which are released by heating which results from the impact of high energy electrons at the surface of an electrode. Outgassing from metallic electrodes is a leading cause of vacuum breakdowns and trapped hydrogen is the primary culprit. Atomic hydrogen (H), is present in metals, e.g. steels, and is trapped at the defects, i.e. grain boundaries, throughout the material. The outgassing mechanism involves H diffusion to the surface of the metal ($D=D_0 e^{-E_A/kT}$) where it recombines to form molecular hydrogen ($H_2$) and is desorbed from the metal (see FIG. 1). Metals with relatively low hydrogen outgassing rates, such as austenitic stainless steel (SS), are the most commonly used materials for vacuum applications. However spontaneous outgassing still occurs even at room temperature presenting a challenge to achieving ultra-high vacuum (UHV) in SS vacuum chambers. To further reduce outgassing in such metals, several treatments have been proven effective, including baking, vacuum baking, polishing, and surface treatments to create oxides or other protective surface films. Electropolishing has been a method of choice since it both reduces the surface roughness of anode materials and creates an oxide layer that further reduces hydrogen outgassing. However, electropolishing may also introduce hydrogen and other contaminants into the surface layers in significant quantity and may necessitate an additional bake to thoroughly degas the surface.

Electrodes in High Power VEDs

High power VEDs generate electromagnetic radiation typically spanning frequencies of 1 GHz to 100 GHz. Their applications include RF amplifiers, microwave generation, and particle accelerators. High power VEDs operate as vacuum tubes where the interaction of a stream of electrons with a magnetic field can either generate or amplify an RF signal. Electrons are produced at the cathode and accelerated by the potential difference with the anode to produce a high velocity electron stream. The interaction of the kinetic energy of the electron current and the electromagnetic radiation in vacuum produces no energy loss or internal heat generation since the electron stream moves through a collision free environment in the evacuated region. However, energetic electrons incident on a conducting surface cause extensive heating, especially on electrode surfaces which are constantly bombarded with electrons, resulting in outgassing and a pressure increase in side the vacuum cavity. This pressure rise in VEDs during their operation is attributed predominantly to hydrogen outgassing that results from hydrogen atoms stored in the electrode's bulk due to their prior exposure to humid air. Plasma may also form at the surface of the electrode due to near-surface ionization of the outgassed neutral atoms by the electrode's desorbed electrons or secondary electrons. This can cause pulse-shortening of the VED and, in the long-term, erosion of the electrode.

The Mechanism of Hydrogen Outgassing from the Electrode

Hydrogen exists as atomic hydrogen at defects such as grain boundaries (GBs) in the electrode's bulk. The binding energy of a GB is larger than the activation energy of hydrogen diffusion and, therefore, the hydrogen atom is trapped within the vicinity of a GB. A GB's binding energy is, however, temperature-dependent (it decreases with temperature rise); increasing the temperature releases hydrogen and increases the outgassing rate of the sample. In polycrystalline metals, at high temperatures, the hydrogen diffusion along the GBs is mainly due to high energy boundaries ("Random", $\Sigma$>29). The $\Sigma$ value is the reciprocal of the fraction of lattice points in the boundaries that coincide between the two adjoining grains. It is calculated from the more restrictive Palumbo-Aust criteria ($\theta \leq 15 \Sigma^{-5/6}$) where $\theta$ is the maximum deviation angle from the computed misorientation angle of the GB. Special boundaries or low energy boundaries (between $\Sigma$3 and $\Sigma$29) will contain fewer hydrogen atoms due to their low binding energy levels and consequently reduces the overall sample's diffusion. Metals with low hydrogen outgassing rates, such as austenitic stainless steel, are the most common materials for vacuum applications, due to low hydrogen outgassing properties. To further reduce outgassing in such metals, several treatments have been proven effective: baking, vacuum baking, polishing, and surface treatments to create oxides or other protective surface films, e.g. titanium nitride or boron nitride.

During operation of a VED, plasma is formed through collisions between secondary electrons and gas molecules, both of which are produced by high energy electron impact at the anode; hydrogen is the most abundant species desorbed from metal surfaces by high energy electron impact. The result is limited device operation and device damage. Accordingly, what is desired is a way to reduce or eliminate $H_2$ outgassing, and to reduce or eliminate secondary electron yield through the reduction of multipacting and plasma formation.

SUMMARY OF THE INVENTION

The present invention overcomes the foregoing problems and other shortcomings, drawbacks, and challenges of outgassing from metals. While the invention will be described in connection with certain embodiments, it will be understood that the invention is not limited to these embodiments. To the contrary, this invention includes all alternatives, modifications, and equivalents as may be included within the spirit and scope of the present invention.

The focus of the disclosure is to describe methods for reducing outgassing, e.g. hydrogen outgassing, from metals. All metals and transition metals would benefit from this methodology. Anodes of 304 stainless steel (SS) were processed by laser surface melting (LSM) to reduce hydrogen outgassing. The LSM technique entails irradiating a sample with the output of a high energy continuous laser beam, thereby causing melting, flow, and re-solidification of the material as the laser beam is scanned across the anode surface. When compared to more conventional processing techniques, such as electropolishing, LSM processing introduces significantly fewer contaminants (especially hydrogen) into the anode surface and reduces outgassing by decreasing the number of grain boundaries through which hydrogen can diffuse. During the LSM process, the surface of the metal is remelted, and hydrogen may be liberated from the liquid metal. Upon recrystallization, the metal surface forms larger grains with correspondingly fewer grain boundaries from which hydrogen or other trapped gasses may diffuse. This method is also applicable to metal compounds containing carbon, sulfur, phosphorous, and other components required to make steels. All such multi-component metal compounds are susceptible to hydrogen embrittlement and hydrogen outgassing, and can thus benefit from the laser surface melting technique.

According to one embodiment of the present invention, a method for reducing outgassing from a metal surface comprises: applying energy from an energy source to the metal surface sufficient to melt the metal surface; and allowing the metal surface to re-solidify, wherein the re-solidified metal surface comprises larger grains and fewer grain boundaries, reducing outgassing sites for a trapped gas. As the surface grains become larger, fewer H atom segregation sites (grain boundaries) are present, resulting in slower H atom diffusion through the newly-solidified layer. This results in less recombination of H atoms into $H_2$ molecules at the sample surface. For optimal results, the laser spot must produce a melt pool larger or equal to the grain diameter. Larger laser energy densities and beam widths result in larger grain growth. To ensure that the specimen's surface has been fully laser melted it is possible to administer a scan overlap, but this should be minimized because each laser pass produces a melted area where the grain structure has been modified, making any subsequent passes disruptive to that result. For best results, there should be little or no scan overlap.

Results have been verified on 304SS with a laser spot size of 40 µm. The original grain dimeter in the 304SS was ~40 µm on average. The melt pools or laser passes were ~46 µm in width. It was demonstrated that higher laser energy densities, with less scan overlap is applied, produce larger grains. For samples treated to date, the depth of the laser surface melt zone has been ~10 µm, however this may be increased with additional laser power. A deeper laser surface melt layer will result in lowering the hydrogen outgassing. Although a deeper surface melt depth is preferred, it is detrimental to processing speed; more laser power required since more energy is required to melt, which provides more time for energy conduction through the material. Therefore the trade-offs between processing time/speed and laser surface melt depth required to reduce the hydrogen outgassing will need to be considered.

According to another embodiment of the invention, the method for reducing outgassing from a metal surface, the application of energy from an energy source is performed in a raster scan pattern.

According to a further embodiment of the invention, adjacent passes in the raster scan pattern overlap sufficiently to melt the entire metal surface, although this is not required, as explained above.

According to another embodiment of the invention, the energy source is a laser.

According to a further embodiment of the invention, a spot size and applied energy of the laser energy source applied to the metal surface is sufficient to melt the entire metal surface, and the wavelength and other characteristics of the applied laser energy are appropriate for the absorption and reflection characteristics of the treated material, e.g. steel, stainless steel, nickel, copper, scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum, gold, lanthanum, cerium, praseodymium, neodymium, actinium, thorium, protactinium, uranium and combinations thereof.

According to another embodiment of the invention, the application of energy from an energy source releases at least some of a gas trapped in the metal.

According to a further embodiment of the invention, the trapped gas is atomic hydrogen.

According to another embodiment of the invention, the metal surface comprises an electrode of a high power system device.

According to a further embodiment of the invention, the metal surface is in one of a high-vacuum environment and a vacuum electronic device.

According to another embodiment of the invention, the metal surface comprises at least one of steel, stainless steel, nickel, copper, scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum, gold, and combinations thereof.

Hydrogen outgassing was induced by repeated pulses (60 s duration) of 60 keV electrons onto LSM-treated and untreated SS samples and recording the $H_2$ signal with a line of sight residual gas analyzer. The data show at least a five-fold reduction in hydrogen outgassing from the LSM treated sample, compared to those that were untreated. The $H_2$ signal from the untreated sample exhibited an initial rapid increase with increasing electron dose, followed by a slow decrease. In contrast, the LSM-treated sample exhibited a monotonic trend that did not increase over time, unlike the untreated sample. Accordingly, the LSM process may be used to reduce hydrogen outgassing from metallic electrodes. Presented herein is a hydrogen outgassing reduction technique at the core of which is a microstructural transformation caused by laser melting the surface of a metal component, e.g. metallic electrodes. The laser surface melting (LSM) technique reduces hydrogen outgassing of stainless steel by stimulating metal grain growth at the surface of the substrate, and no post-processing is necessary to preserve the benefits of the LSM treatment. To be clear, the disclosed method is a two-step process. First, hydrogen is outgassed from the laser melted layer. In the second step, grain enlargement and grain boundary fraction reduction slows down hydrogen atom transport in that layer. 60 keV was used above, but this is not the only value acceptable. The process to induce hydrogen outgassing requires that the sample is heated sufficiently to induce such outgassing without burning through the material or otherwise rendering the material unfit for its intended use.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention. The patent or application file contains at least one drawing executed in color. Copies of this patent or patent application publication with color drawing(s) will be provided by the Office upon request and payment of the necessary fee.

FIGS. 6A-6B depict an elevated view and a perspective view of a 304 stainless steel (SS) sample after being subjected to laser surface melting, according to an embodiment of the invention;

FIGS. 12A-12E illustrate the grain size control that is possible with the laser surface melting method, according to an embodiment of the invention;

FIGS. 16A-16B illustrate combined three-angle Euler maps of untreated and laser-treated 304 stainless steel, according to an embodiment of the invention;

FIGS. 17A-17B illustrate combined three-angle Euler maps of untreated and laser-treated 304 stainless steel, 0.6 mm thick, 19.17 $kJ/cm^2$, according to an embodiment of the invention;

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 2:
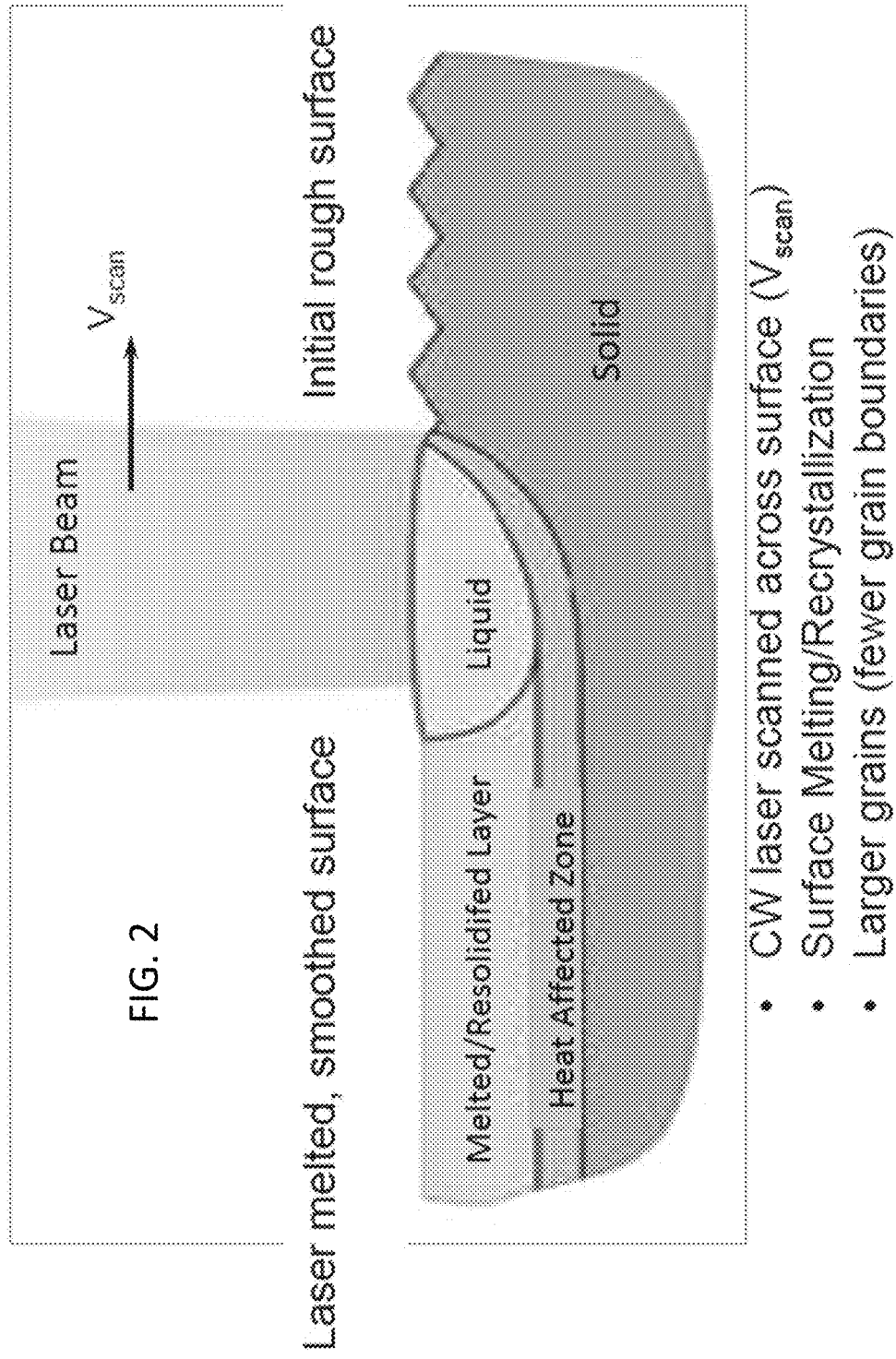
FIG. 2 illustrates a laser surface melting method, according to an embodiment of the invention.

The Laser Surface Melting (LSM) processing technique entails irradiating a sample, e.g. a steel sample, with the output of a high energy laser beam, e.g. a continuous wave (CW) laser beam, thereby causing melting, flow, and re-solidification of the surface of the sample material as the laser beam is scanned across the sample surface, as illustrated in FIG. 2. This process is demonstrated to significantly reduce outgassing, e.g. hydrogen outgassing, of the material by forming a crystalline surface layer having fewer grain boundaries, thereby reducing the number of sites that can trap hydrogen in the metal. In addition, the method releases gasses that are trapped in the surface of the material. When compared to more conventional processing techniques for reducing outgassing, such as electropolishing, the LSM process introduces significantly fewer contaminants (especially hydrogen) into the anode surface. The LSM process is demonstrated to reduce the outgassing of hydrogen by a factor of about 50× (see FIGS. 14, 18, 23) from metal surfaces when compared to non-treated surfaces.

Laser surface melting (LSM) of polycrystalline metals and their alloys liberates trapped hydrogen from the liquid metal at the sample's surface and, upon solidification of the metal, results in increased grain size and a decreased number of grain boundaries (GBs), i.e. hydrogen trapping sites, in the processed surface of the sample. This creates a hydrogen diffusion reduction layer at the surface of the sample which separates the metal's bulk from its external environment. The rate of a metal's hydrogen outgassing is able to be regulated by the grain size in the diffusion reduction layer; larger grain size corresponds to lower rates of outgassing.

The purpose of the invention is to reduce the emission of gaseous species, e.g. hydrogen, from metallic materials in high-vacuum environments. In a vacuum electronic device, the cathode generates an electron beam and the anode can extract, collect, or guide it. Interaction of the electron beam with the metal anode results in significant heating and outgassing of the anode. This outgassing results in increased pressure, and reduces the vacuum pressure, i.e. compromising the vacuum, which can lead to vacuum collapse and device failure. Current methods for outgassing reduction rely on methods such as mechanical polishing and baking. The best results from baking a vacuum chamber demonstrate a reduction in hydrogen outgassing by a factor of 20×. The results of outgassing reduction from metals are beneficial to a wide range of fields, including vacuum electronics, the manufacturing of stainless steel vacuum chambers, and for electrical contacts required in vacuum.

In accordance with an embodiment of the invention, anodes of 304 stainless steel (SS) were processed by a continuous wave Yb fiber laser with a wavelength of 1.064 microns. This process melts and recrystallizes the metallic surface, releasing trapped hydrogen in the process and reducing the total area of grain boundaries. This Laser Surface Melting (LSM) technique results in a surface melt zone from about 10-100 microns thick. The surface-treated SS sample was tested in a simulated anode configuration by subjecting it to 50 keV electron beam bombardment in order to determine the extent to which hydrogen outgassing is reduced by the laser surface melting treatment. A 50× reduction in H outgassing was observed over a non-treated sample, which is a 250% improvement over the best of the prior art methods.

A continuous wave Yb fiber laser with a wavelength of 1.064 microns may be used to treat sample surfaces. All lasers may be used for such treatment; continuous wave lasers will have a larger laser melt depth compared to pulsed lasers. The laser may be scanned, e.g. raster scanned, over the sample surface to treat large surface areas. The fiber laser may be integrated with a 3-D manipulator and a CAD program to treat the surface of vacuum components, i.e. electrodes or other samples, having complex shapes. The LSM technique may be used to treat metals other than SS; copper and nickel samples have been treated as well with similar results. The laser wavelength may be changed to best match the absorption and reflection characteristics of the treated material.

Experimental Results

Anodes of 304 stainless steel were processed by a continuous wave Yb fiber laser with a wavelength of 1.064 μm and subjected to 50 keV electron bombardment in order to determine the extent to which hydrogen outgassing is reduced by the laser surface melting treatment. The results show a reduction in outgassing, by approximately a factor of four compared to that from untreated stainless steel. The reduction in outgassing is attributed to a reduction in the number of grain boundaries. The grain boundaries serve as trapping sites for hydrogen in stainless steel. Such laser-treated anodes do not require post-processing to preserve the benefits of the treatment and are excellent candidates for use in high power source (HPS) devices.

Figure 3:
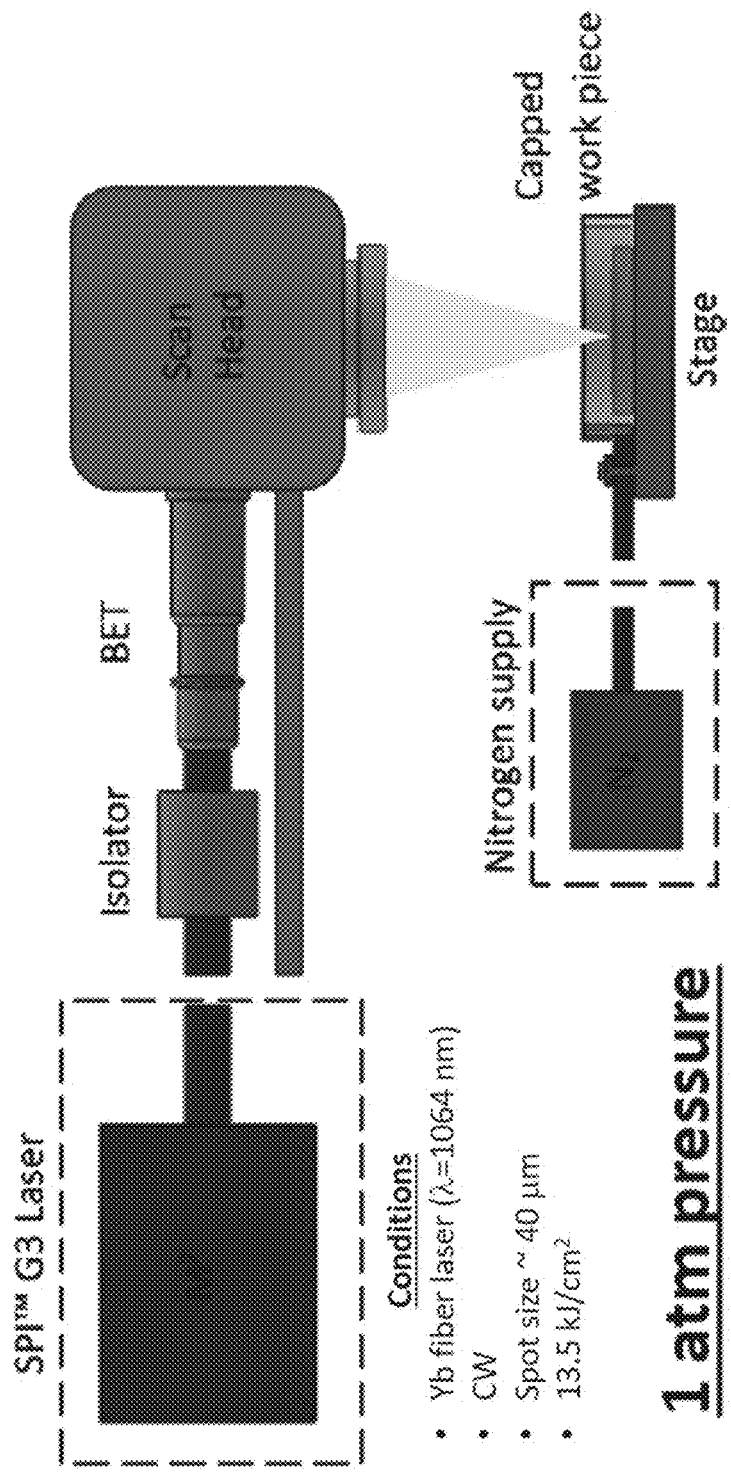
FIG. 3 illustrates an apparatus for performing laser surface melting, according to an embodiment of the invention.
Figures 4A, 4B:
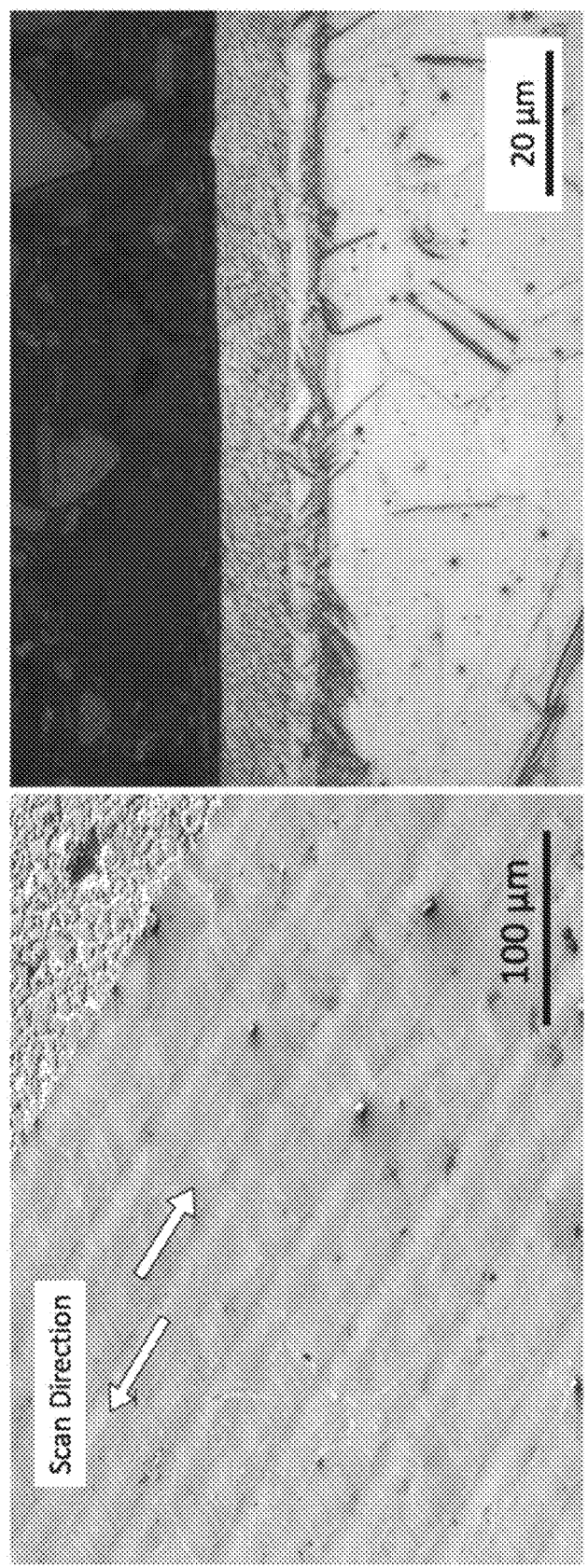
FIGS. 4A-4B illustrate an elevated view and a sectional view of a 304 stainless steel (SS) sample after being subjected to laser surface melting, according to an embodiment of the invention.

Samples of 304SS were irradiated at normal incidence by a nonpolarized Continuous Wave (CW) SPI™ G3 Yb fiber laser (M2=2, input beam diameter 4.3 mm), with a wavelength of 1.064 μm, maximum output power of 20W and nominal spot size of 39.4 μm. The treatment was carried out at atmospheric pressure under constant $N_2$ flow into the capped stage ($O_2$ levels<0.2%), as shown in FIG. 3. The beam expander telescope (BET) supplied an input beam of 4.3 mm in diameter to the laser head.

The lens used in the laser setup was a Jenoptic™ fused silica lens with focal length of 125 mm. For patterning the sample, a bidirectional raster scan was applied with a line separation of 30 μm and irradiated with an average laser energy density (ED) of 13.54 kJ/cm². Other particular scan parameters will be determined by the size of the grains in the surface of the metal. The laser spot size must be larger or equal to the grain diameter. An Olympus BX51™ optical microscope with JENOPTIC™ ProgResC10+CCD camera was used to obtain images and depth measurements of the treated samples. For the depth measurements, the SS samples were cut along the laser-scanning track and mechanically polished using standard metallographic techniques. The samples were chemically etched in SS microetchant, having a chemical composition of 10 g $FeCl_3$, 30 ml HCl, 120 ml water, at room temperature to reveal the general microstructure. Scanning electron microscopy (SEM) images were acquired with a FEI™ Quanta 3D system equipped with a field emission gun (FEG). Microstructural characterization was conducted with the help of focused ion beam (FIB) microscopy and Philips XL30 SEM with FEG in secondary electron mode to obtain orientation maps. HKL-Tango™ software was used to quantify the grains and grain boundaries (GBs). GBs were categorized in two groups, special ($3<\Sigma\leq29$) and random ($29<\Sigma\leq49$), where $\Sigma$ is the reciprocal of the fraction of the common lattice sites (CSL) from each grain at the boundary. More restrictive Palumbo-Aust criterion is used to determine the $\Sigma$ number.

Outgassing characterization was carried out by bombarding at normal incidence the SS samples with the focused output of a 50 keV electron beam with a spot size of 1.6 mm in diameter (determined by measuring the size of a hole formed in a thin Ni foil under conditions identical to those used for the present work) with 60 s duration current pulse, and recording the time evolution during the pulse of the $H_2$ signal with a residual gas analyzer situated 45 degrees from the surface normal. The electron current density at the sample surface was approximately 16.4 mA/cm², and the base pressure was $5\times10^{-10}$ Torr.

In order to form samples for depth characterization and outgassing evaluation, the SS samples were processed by raster scanning the laser beam across the surface in a uniform pattern. Shown in FIGS. 4A, 6A-6B, and 9 is an SEM image of the raster scanned surface of the SS sample, tilted at 45 degrees to the electron beam column; the LSM-treated and untreated areas are visible in FIGS. 4A, 6A-6B, and 9. The individual laser tracks can be seen as well as the ripples within each track that are oriented in the direction of the laser beam scan; this is a phenomenon in CW laser melting commonly observed at high laser ED, i.e. energy density of the laser per surface area, values. Processing with lower ED tends to avoid ripple formation in the irradiated area but also reduces grain growth in the lattice of the sample. There are also small, bump-like formations seen within the treated area of FIGS. 4A, 6A-6B, and 9. Note that the bump-like features extend above the plane of the laser treated area and occur near the overlap between adjacent laser scan lines. Overlap parameters will depend on the laser spot size; more overlap guarantees the complete remelting of the surface. These bump features represent areas of the SS surface morphology that were incompletely melted by LSM and result from the specific choice of scan parameters (laser spot size and degree of overlap between adjacent scan lines) for the results shown here. These features can be minimized by a different choice of initial scan parameters or by subsequent laser passes over the sample. Shown in FIGS. 4B, 7A, 8, and 10 is a longitudinal cross-section (optical) view of LSM-treated samples, where the treated region is comprised of an LSM zone (LSMZ) and heat-affected zone (HAZ) for a continuous wave Yb fiber laser having a power output of about 17 W, and beam diameter of about 39.4 mm, and a scanning velocity of about 2.25 mm/s, such that the sample is subjected to about 13.54 kJ/cm². The depth of the LSMZ is approximately 9.7 µm.

Figure 5A:
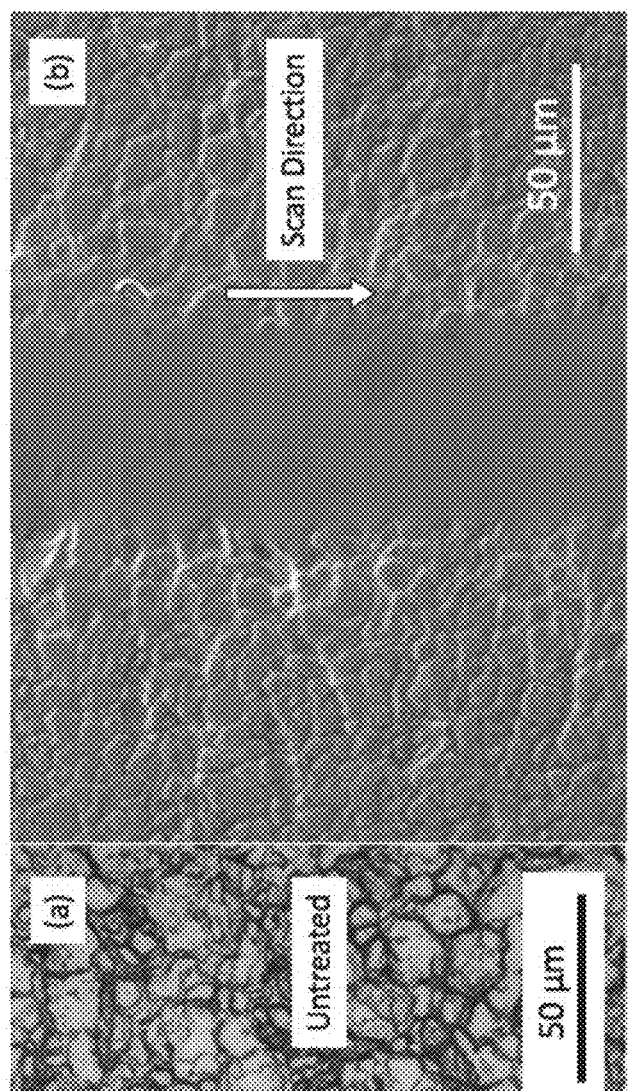
FIGS. 5A-5B depict optical and scanning electron microscope images of a metal sample after laser surface melting after a single pass with a laser, according to an embodiment of the invention.
Figure 5B:
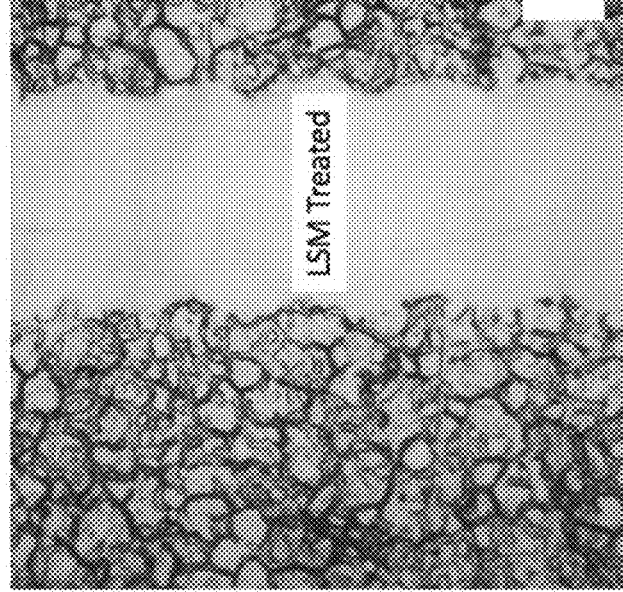

FIGS. 5A-5B depict optical (FIG. 5A) and scanning electron microscope (FIG. 5B) images of a metal sample after laser surface melting after a single pass with a laser. Scan direction was from the top of the images toward the bottom, corresponding to the smooth, featureless stripe bisecting the images. The LSM method stripe is sample material that has been melted and recrystallized, resulting in a significantly smoother surface that includes less trapped gas, e.g. hydrogen.

Figure 7A:
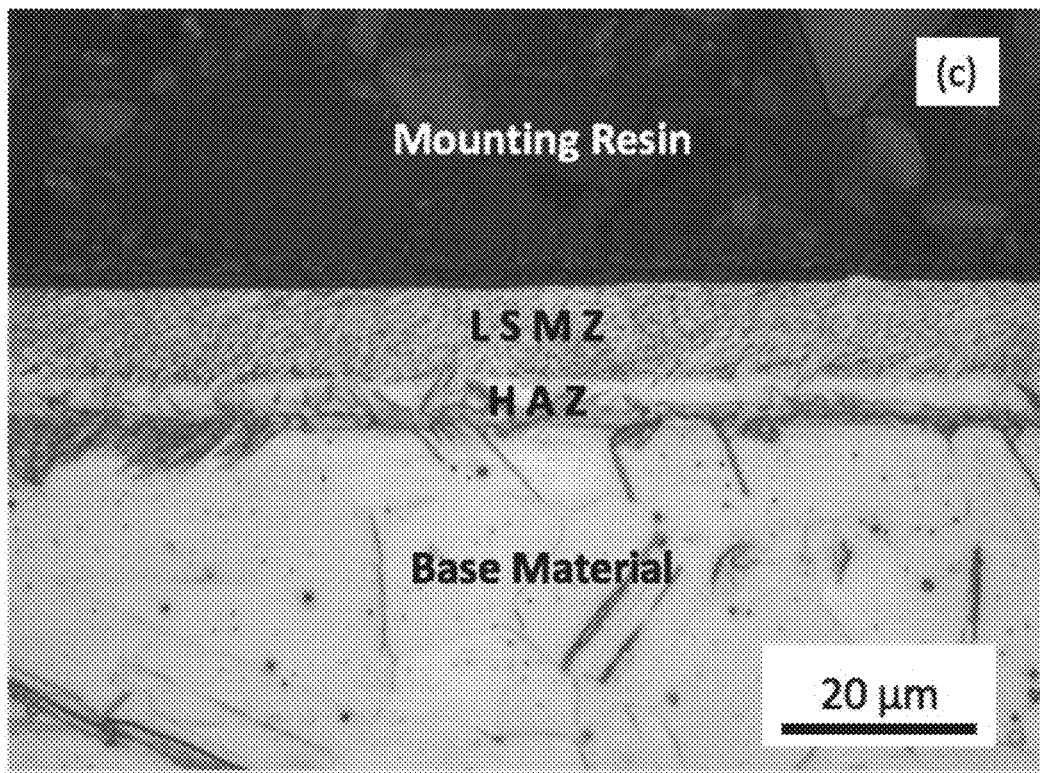
FIG. 7A illustrates a section of a stainless steel sample treated with LSM showing the depth of the laser surface melt zone (LSMZ), the heat affected zone (HAZ), and the bulk material, according to an embodiment of the invention.
Figure 7B:
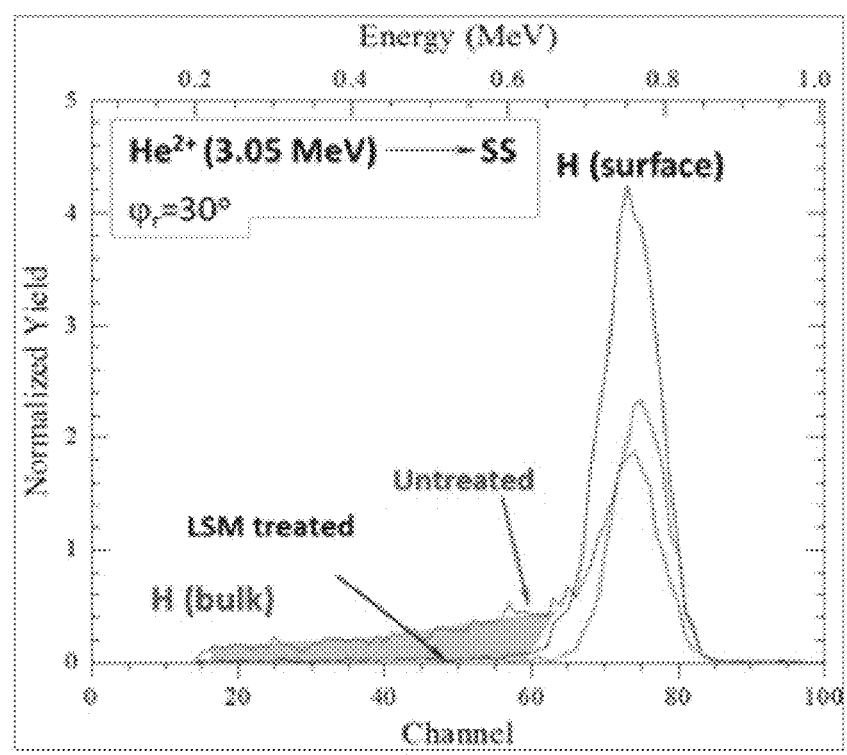
FIG. 7B illustrates Rutherford Back Scattering (RBS) data for the treated sample of FIG. 7A, showing significant H reduction in the LSM region (black line), according to an embodiment of the invention.
Figure 7C:
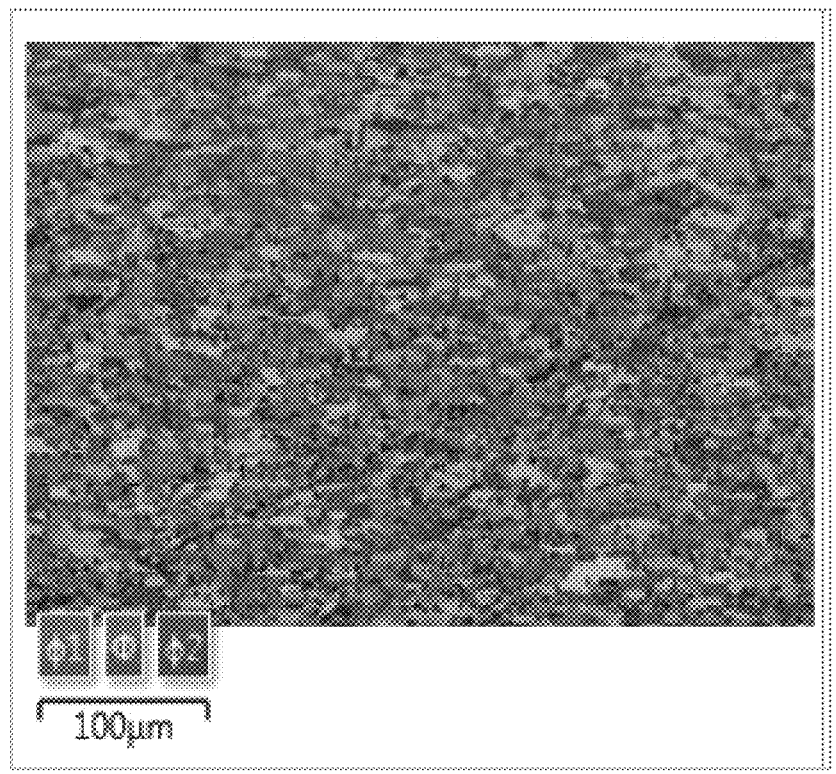
FIG. 7C depicts the surface of a stainless steel sample before treatment by LSM.
Figure 7D:
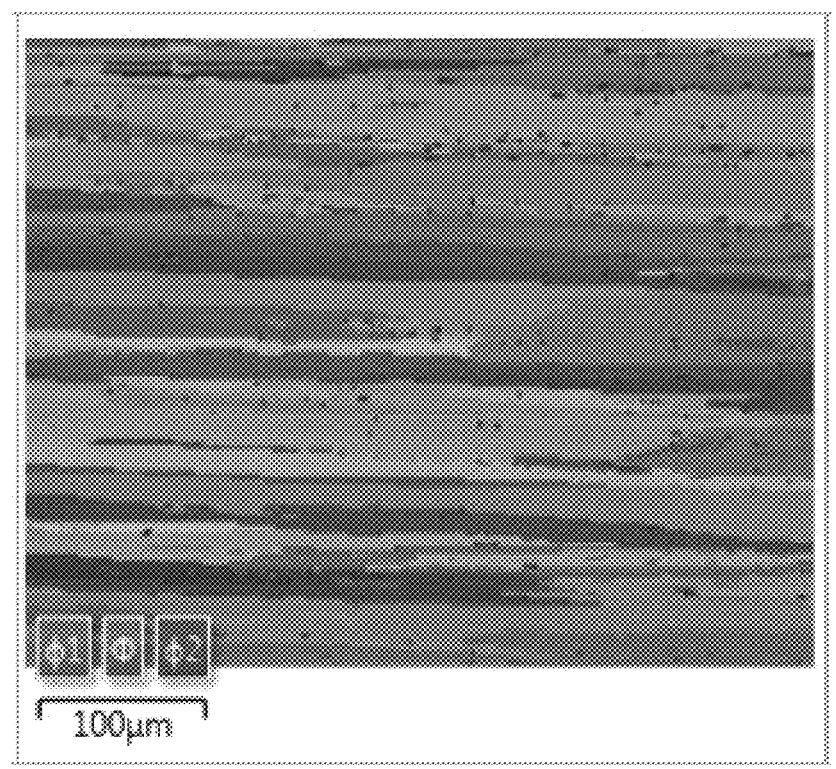
FIG. 7D depicts the surface of a stainless steel sample after treatment by LSM, according to an embodiment of the invention.
Figure 7E:
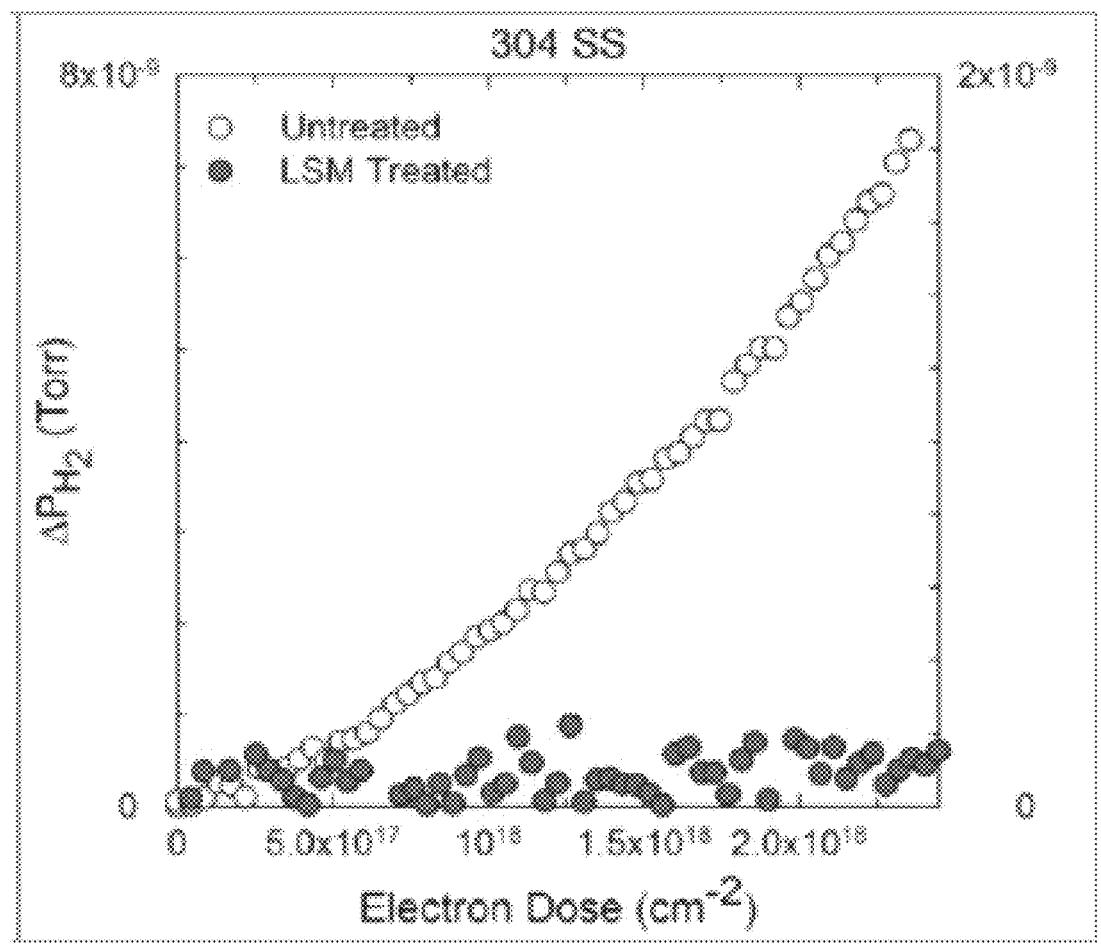
FIG. 7E illustrates a plot of outgassing results showing the change in $H_2$ partial pressure with electron dose during a 60s electron irradiation, according to an embodiment of the invention.
Figure 8:
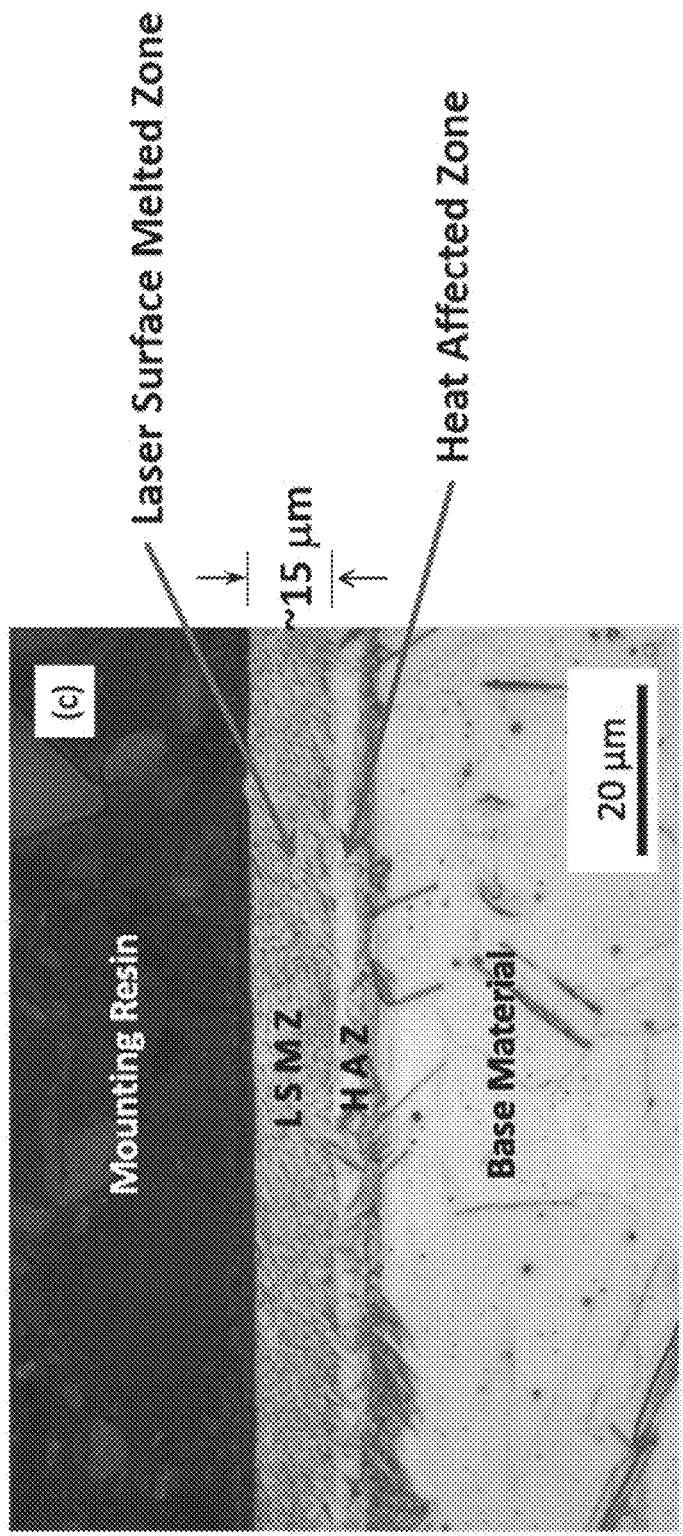
FIG. 8 illustrates a section of a stainless steel sample treated with LSM showing the depth of the laser surface melt zone (LSMZ), the heat affected zone (HAZ), and the bulk material, according to an embodiment of the invention.
Figure 9:
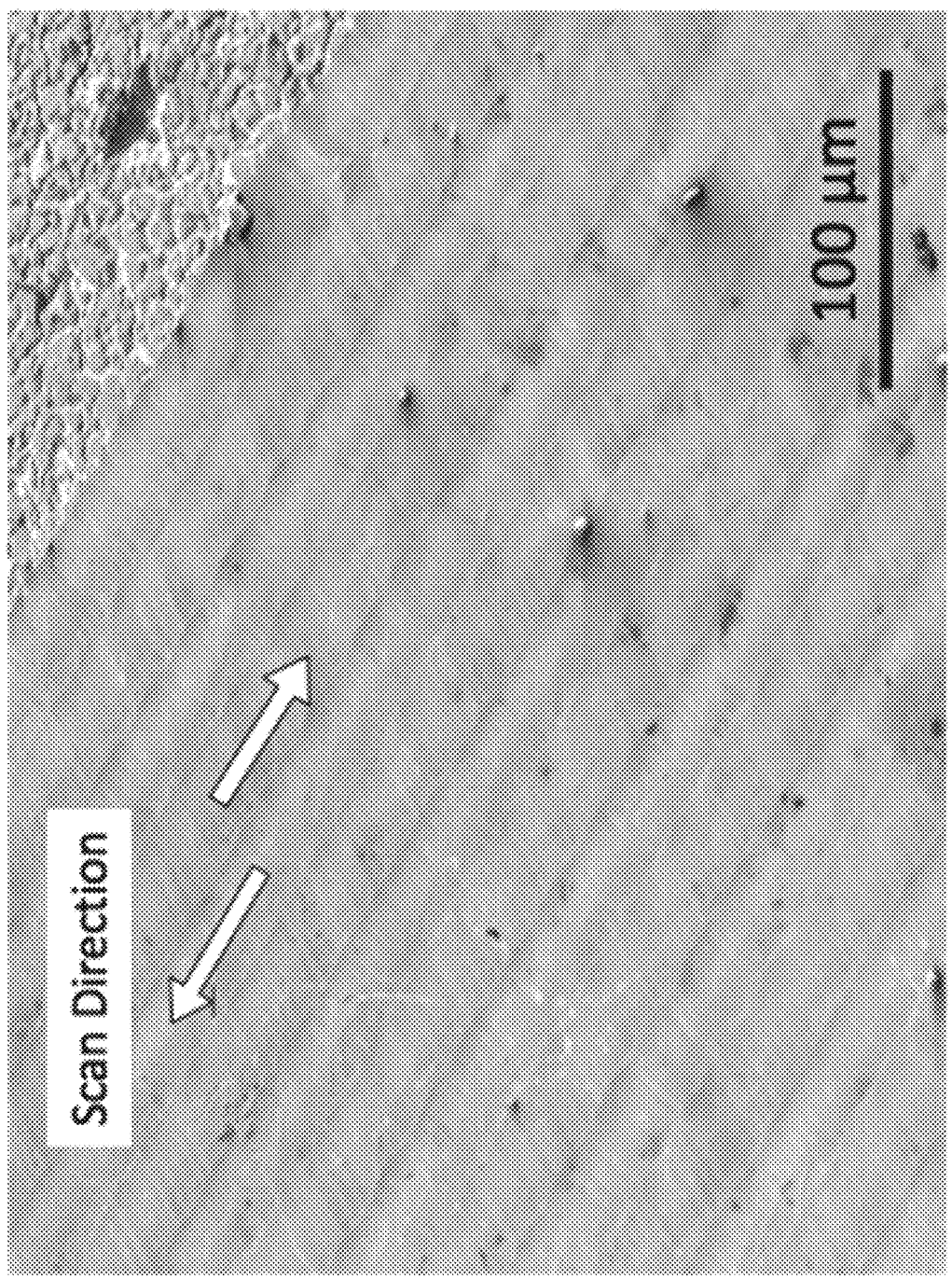
FIG. 9 illustrates a sectional view of a 304 stainless steel sample after being subjected to laser surface melting, according to an embodiment of the invention.

FIG. 7B illustrates Rutherford backscattering (RBS) data for the LSM-treated surface, showing a significant reduction in the amount of hydrogen in the LSM region, corresponding to the horizontal black line at the bottom of the graph. FIG. 7E illustrates a plot of outgassing results showing the change in H₂ partial pressure with electron dose during 60s electron irradiation. The performance of samples treated with the LSM method is clearly superior to that of untreated samples.

Shown in FIGS. 7C, 7D, 11A-11B, 12A-12E, and 13A-13B are FIB images of the untreated and treated samples demonstrating the microstructural changes induced by the laser radiation. It can be observed that the grains in the laser-treated samples, FIGS. 7D, 11B, 12A-12E, and 13A-13B, are elongated in the direction of the laser scan and have increased in size as a result of laser processing, as detailed below in Table 1. The total number of grains was reduced from 1,020 to 617 per 0.12 mm² unit volume. This transformation has the net effect of reducing the number of special and random GBs (grain boundaries) in the laser-treated volume and supports the outgassing data showing less H₂ released from such samples.

TABLE 1

Grain Boundary Character Distribution per 0.12 mm² surface area

| Position | Σ3 | Σ9 | 3 < Σ ≤ 29 | 29 < Σ ≤ 49 | Average grain size (µm) | Average grain area (µm²) |
|---|---|---|---|---|---|---|
| Base Material | 33.81 | 1.43 | 35.11 | 0.07 | 10.72 | 99.88 |
| LSMZ | 15.39 | 0.82 | 16.66 | 0.05 | 14.12 | 201.59 |

Figure 10:
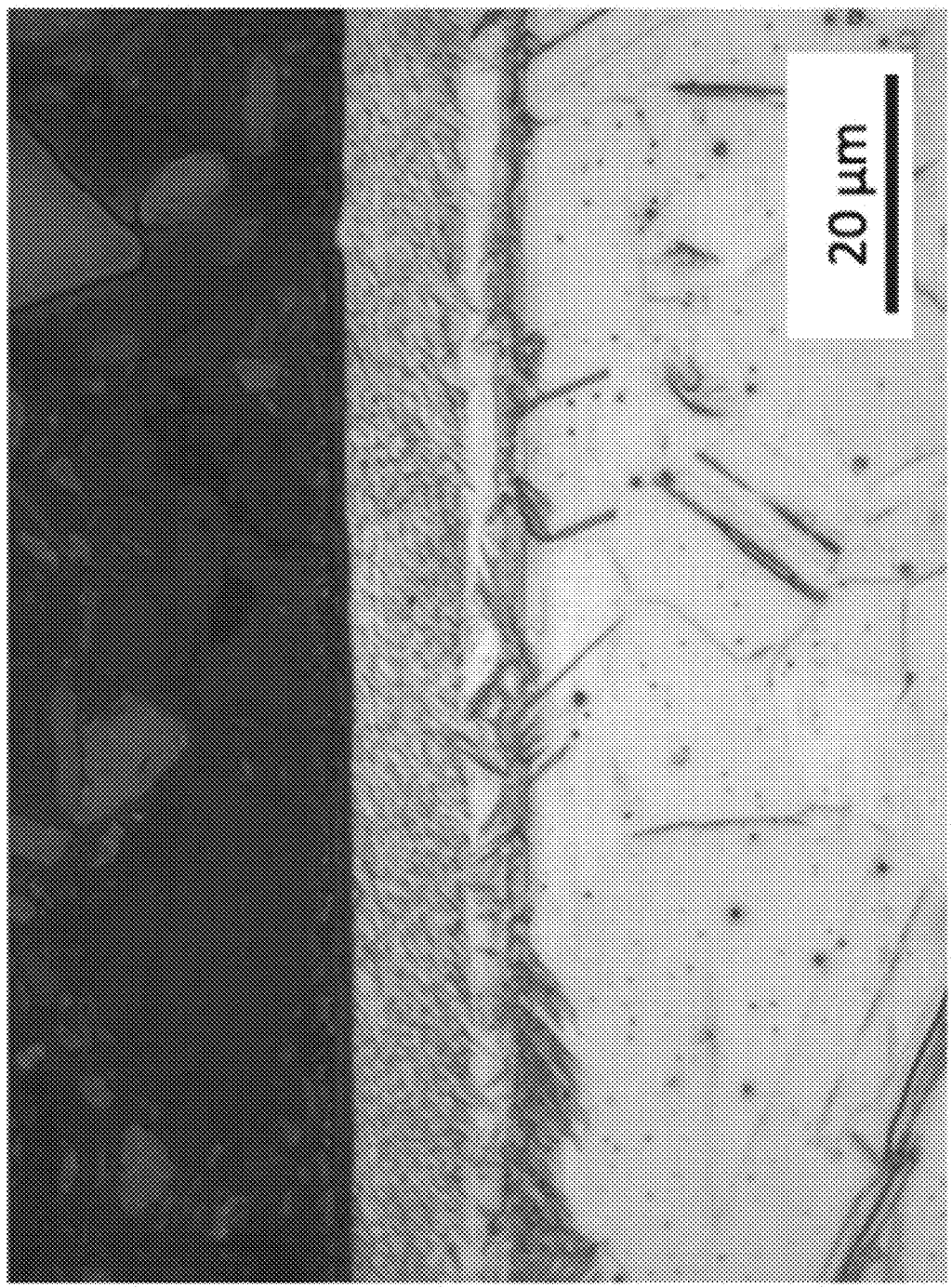
FIG. 10 illustrates a sectional view of a 304 stainless steel sample after being subjected to laser surface melting, according to an embodiment of the invention.
Figures 11A, 11B:
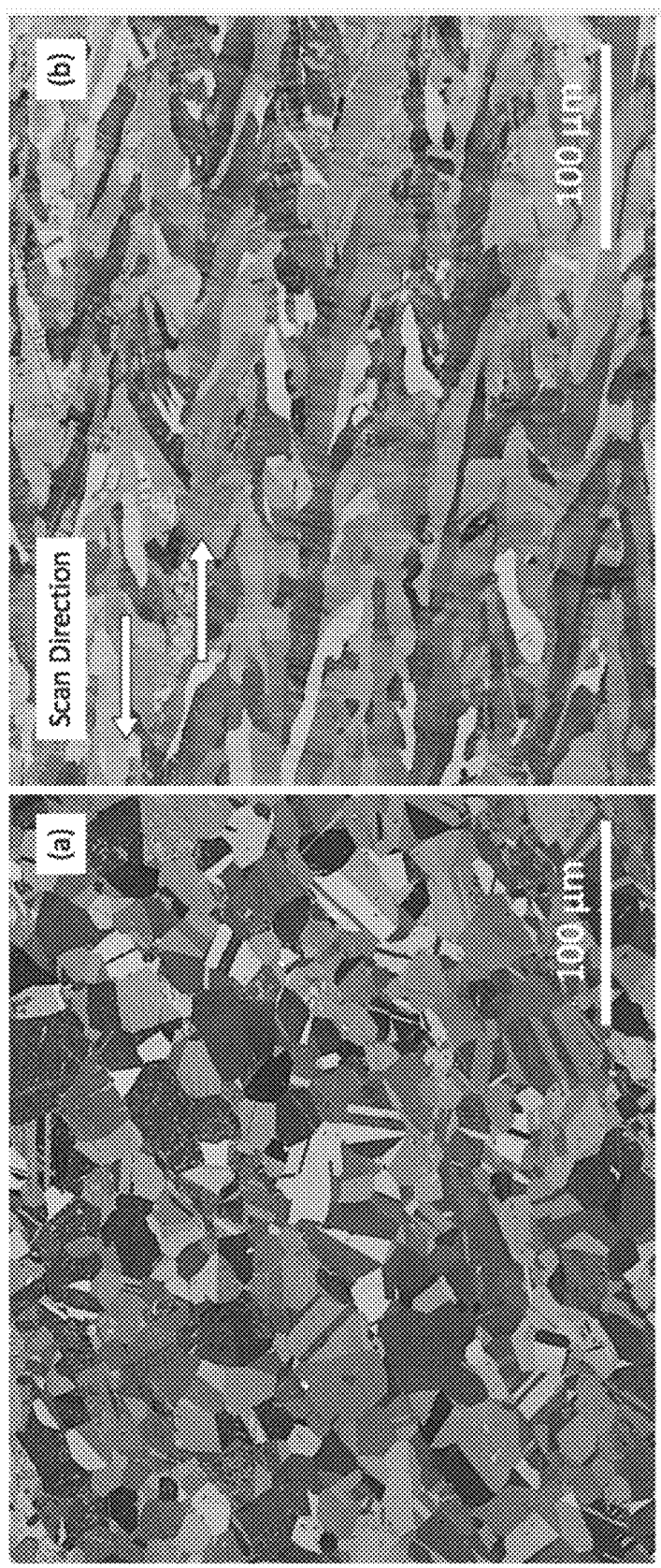
FIGS. 11A-11B illustrate FIB (focused ion beam) images showing the microstructure of an untreated and a treated stainless steel sample, according to an embodiment of the invention.
Figure 13A:
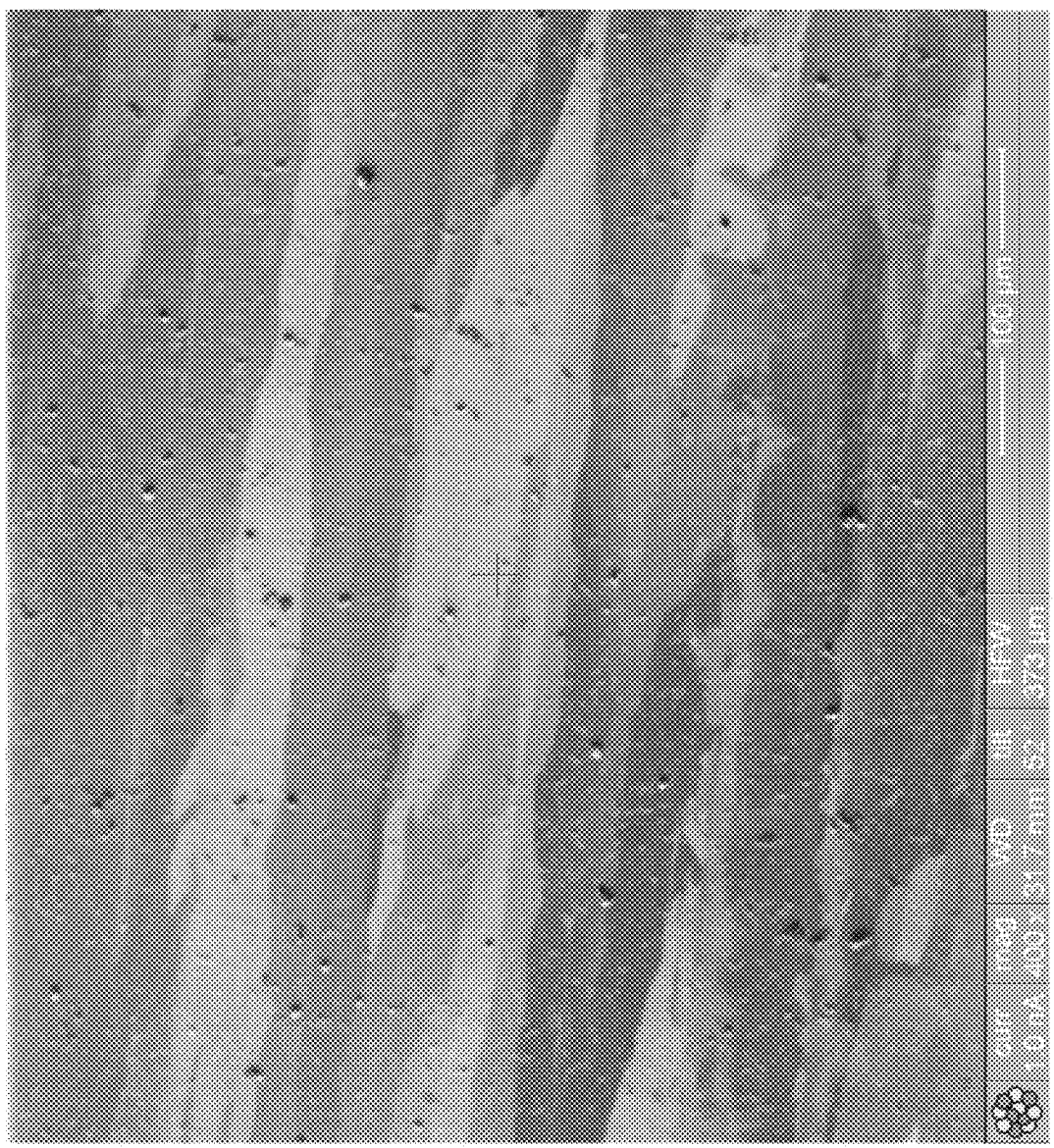
FIGS. 13A-13B illustrate FIB images of a laser-treated microstructure of 304 stainless steel with 19.17 $kJ/cm^2$, according to an embodiment of the invention.
Figure 13B:

Table 1 above suggests that it is the grain boundary character distribution, i.e., the spectrum of misorientations and inclinations, which is changed as a result of the laser melting method. Increasing further the grain size would entail extending the surface cooling time. In fact, as shown in FIG. 10, during laser melting only a thin surface layer is melted, which then rapidly solidifies due to the high heat outflow toward the solid substrate. Therefore, the spectrum of misorientations and inclinations corresponds to a temperature close to the melting temperature $T_m$. However, it is well-known that the equilibrium grain boundary character distribution changes significantly with temperature. For instance, in conventional solidification, the temperature actually decreases slowly, and the spectrum of grain boundary misorientations and inclinations corresponds to a lower temperature of about $0.5~T_m$.

Figure 1:
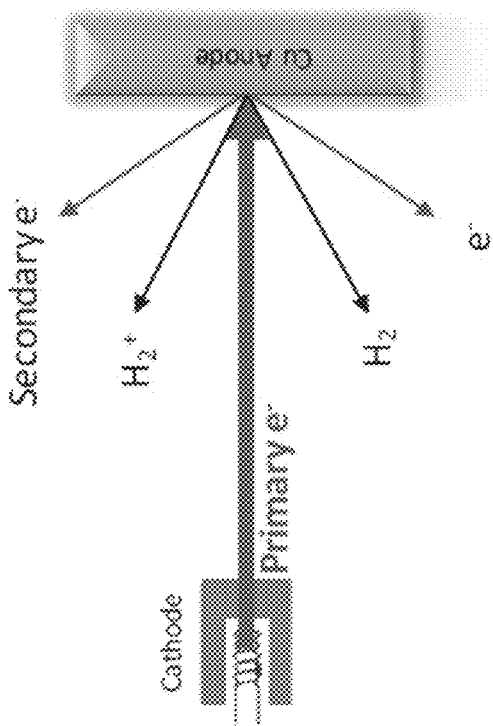
FIG. 1 illustrates prior art anode problems in high pulsed power electromagnetic devices.
Figure 14:
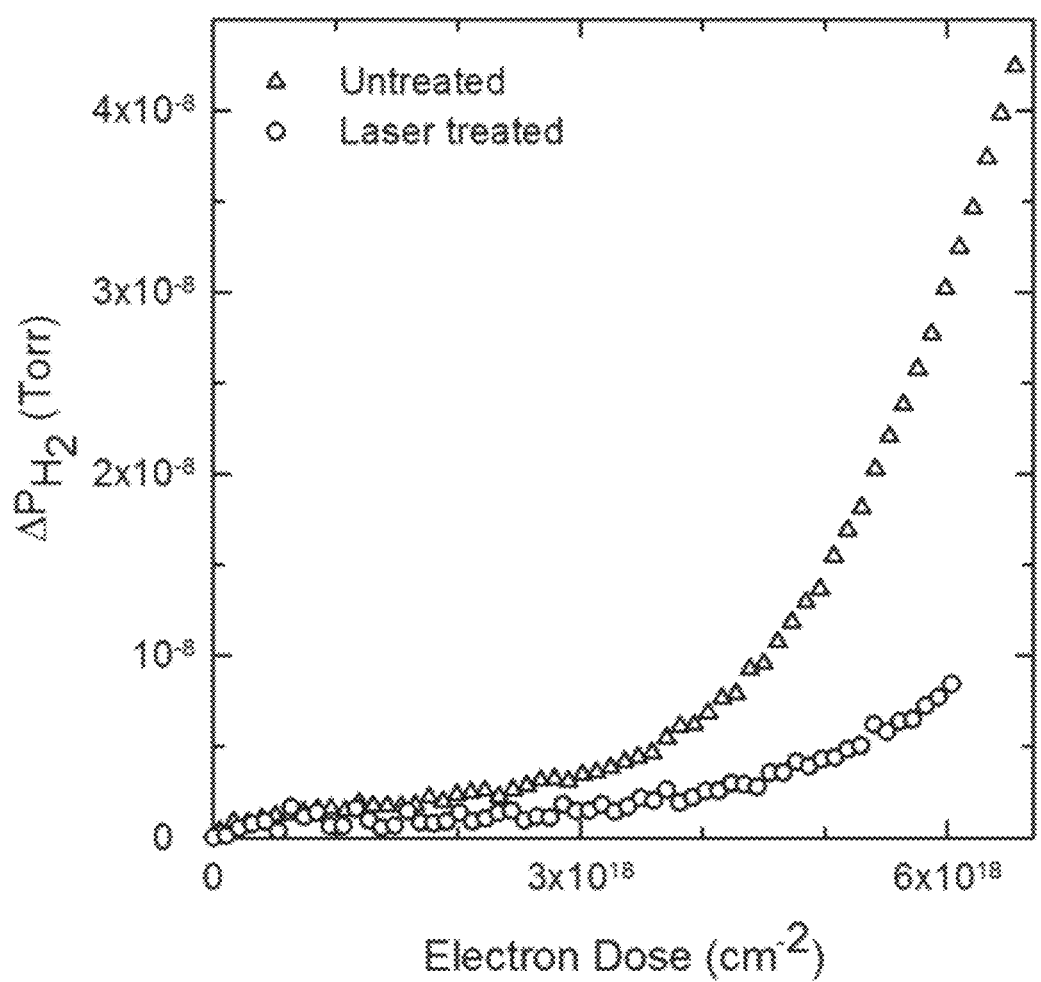
FIG. 14 illustrates outgassing results showing the change in $H_2$ partial pressure with electron dose during a 60 s electron radiation exposure, according to an embodiment of the invention.
Figure 18:
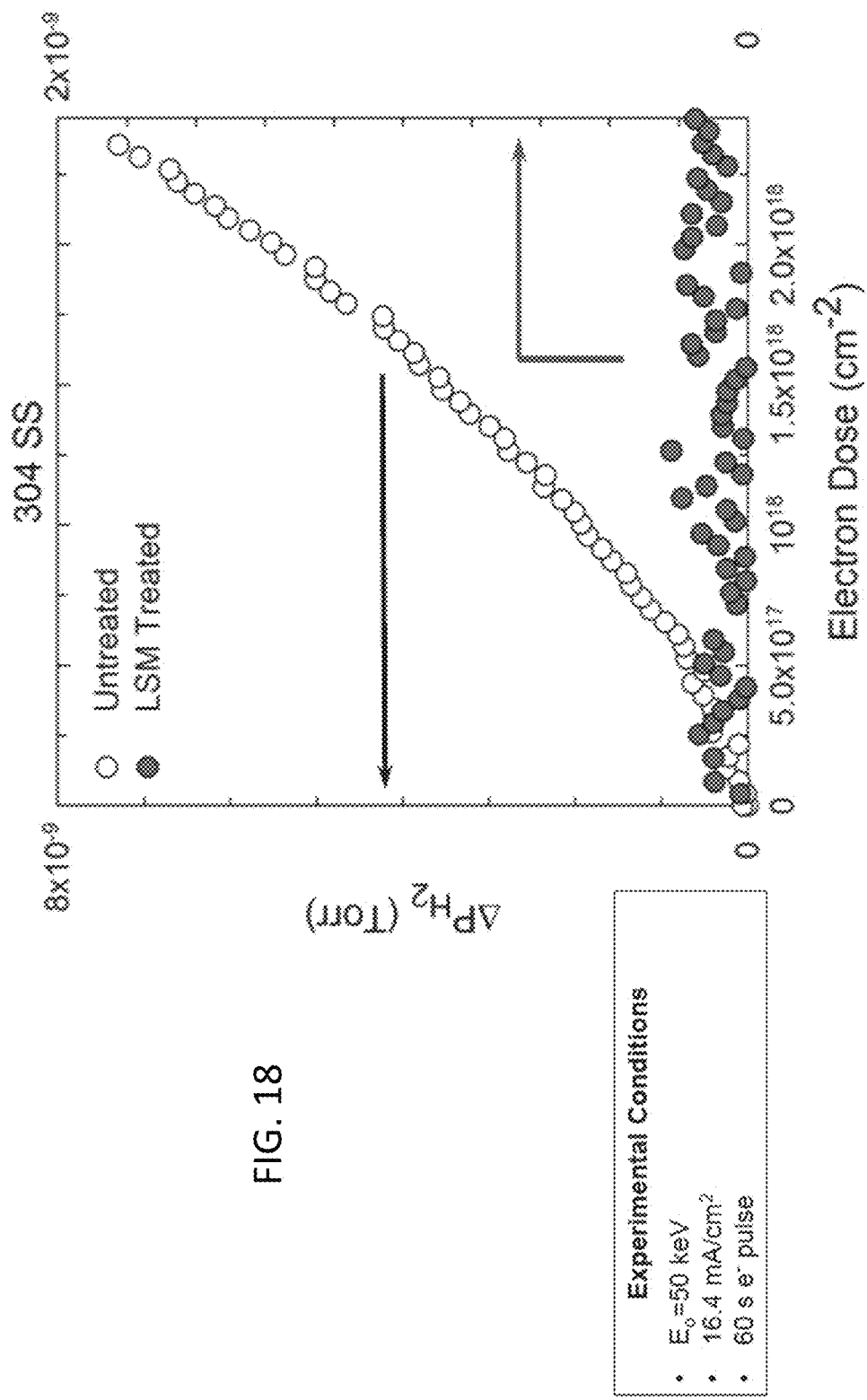
FIG. 18 illustrates outgassing results of laser surface melting-treated and untreated steel samples, according to an embodiment of the invention.
Figure 23:
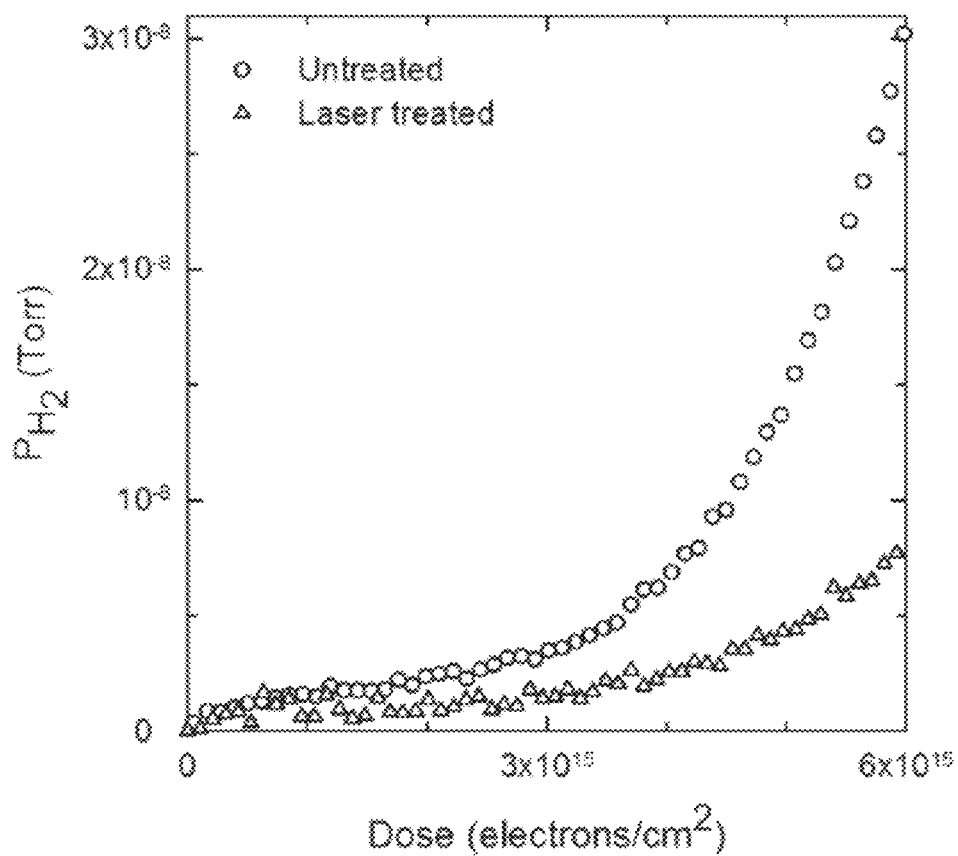
FIG. 23 illustrates the results of hydrogen outgassing testing of untreated and laser surface melting-treated steel, according to an embodiment of the invention.

Shown in FIGS. 14, 18, and 23 are the outgassing results, which are presented as the change in H₂ partial pressure (above baseline) with electron dose. Both curves exhibit an increase in H₂ signal with electron dose. Note that the H₂ signal for the untreated sample does not immediately rise with electron dose but instead shows an incubation period (extending from a dose of 0 to $\sim 3\times 10^{18}$ cm²) in which the H₂ signal first increases gradually, after which there is a more rapid, nonlinear increase. Hydrogen is present within many metals, where it exists as atomic H at defects such as GBs; Hydrogen outgassing from metals occurs through a series of steps consisting of (a) diffusion of atomic H to the metal surface, (b) recombination of atomic H at the surface and (c) desorption of nascent, molecular hydrogen H₂ into the gas phase (see FIG. 1). The incubation period most likely is comprised of step (a) in which the majority of incident electron flux goes toward heating the sample and enhancing H atom diffusion to the surface. Only after the induction period is there sufficient atomic H at the surface that steps (b) and (c) proceed more efficiently and a larger desorbed H₂ signal is detected. The data from the LSM-treated sample exhibits a smaller initial slope, suggesting a lower rate of diffusion of atomic H to the surface because of the decreased number of GBs. The data indicate that H₂ outgassing from the LSM-treated sample was approximately a factor four less than that from the untreated SS sample, for the conditions employed here.

Figure 19:
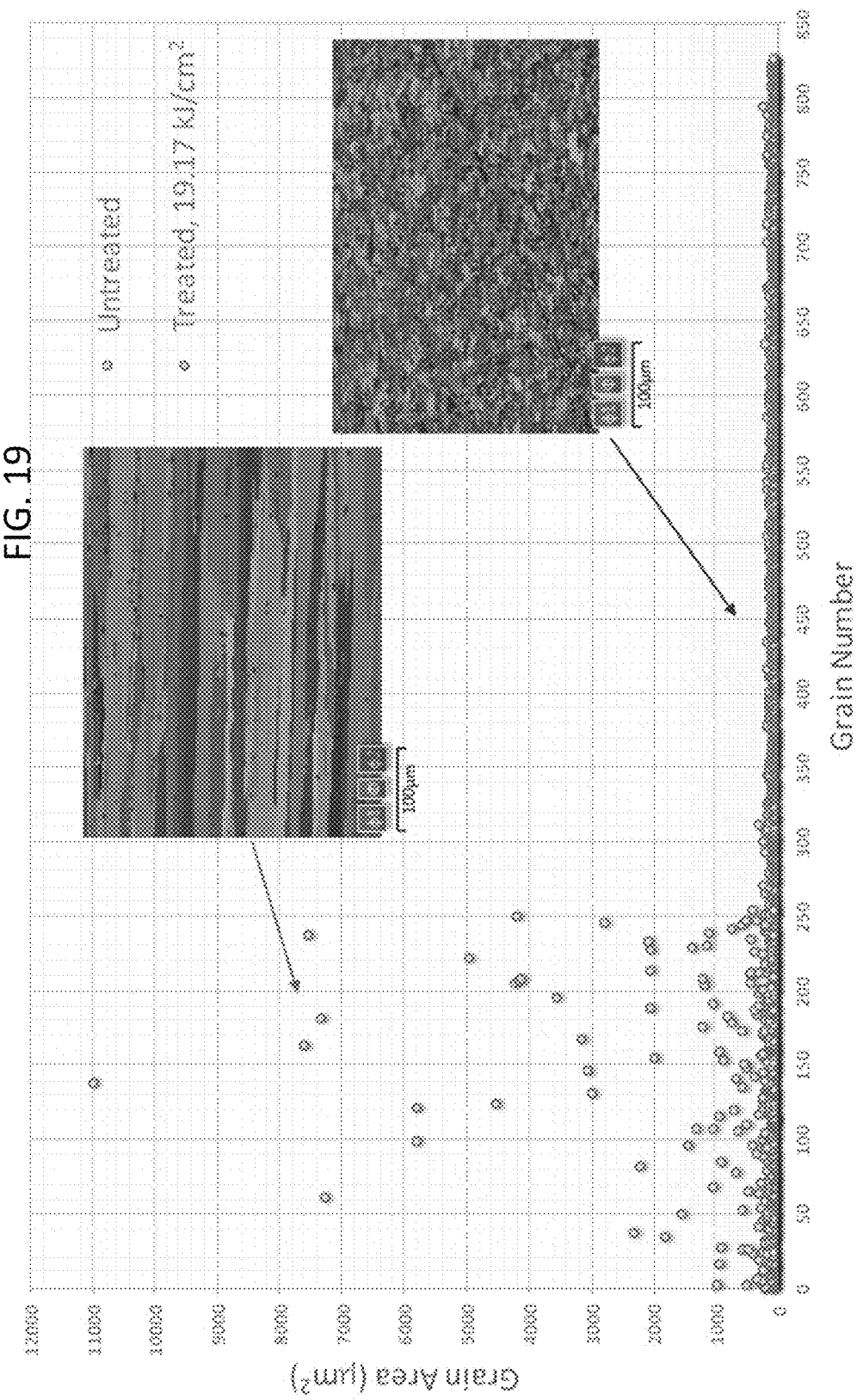
FIG. 19 illustrates grain area measurements with electron backscatter diffraction analysis for treated and untreated steel samples, according to an embodiment of the invention.
Figure 21:
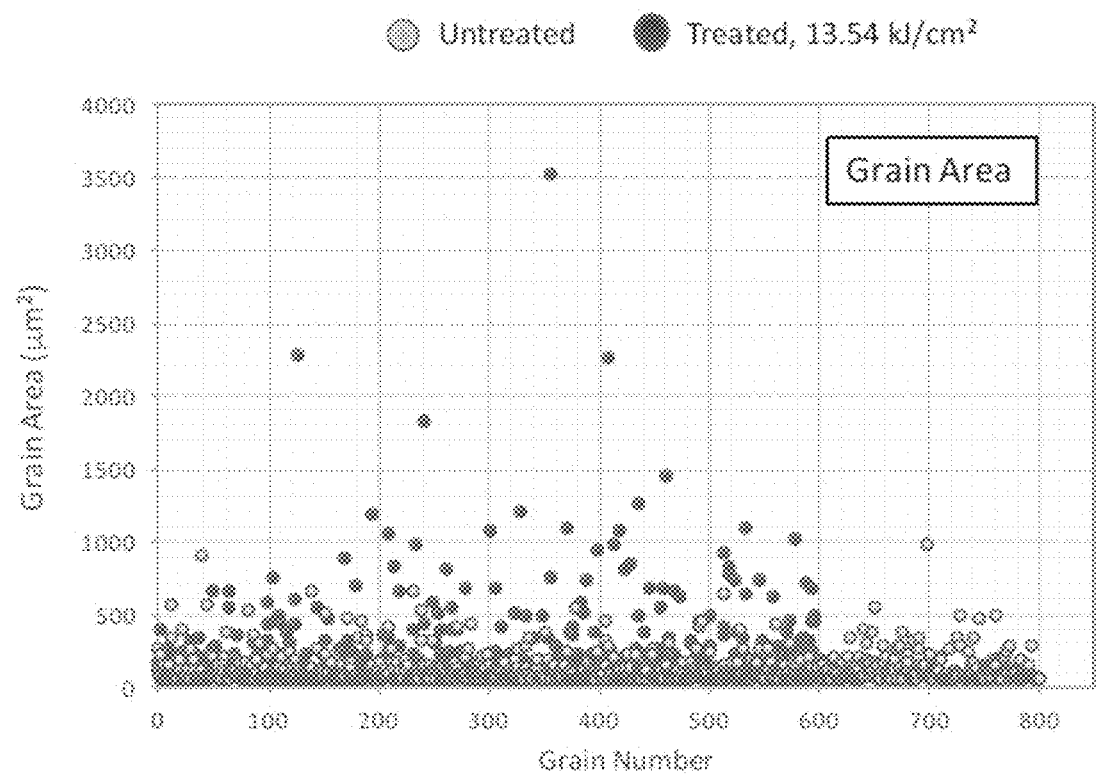
FIG. 21 illustrates grain area measurements of untreated and laser surface melting-treated steel, according to an embodiment of the invention.

FIG. 19 illustrates grain measurement with electron backscatter diffraction analysis, which shows a significant increase in the grain area for a metal sample treated by LSM at 19.17 kJ/cm². The increase in grain size for LSM-treated metal samples is associated with a significant reduction in hydrogen outgassing. FIG. 21 illustrates the significant increase in grain area for LSM-treated metal samples, as compared with untreated samples.

Figure 20A:
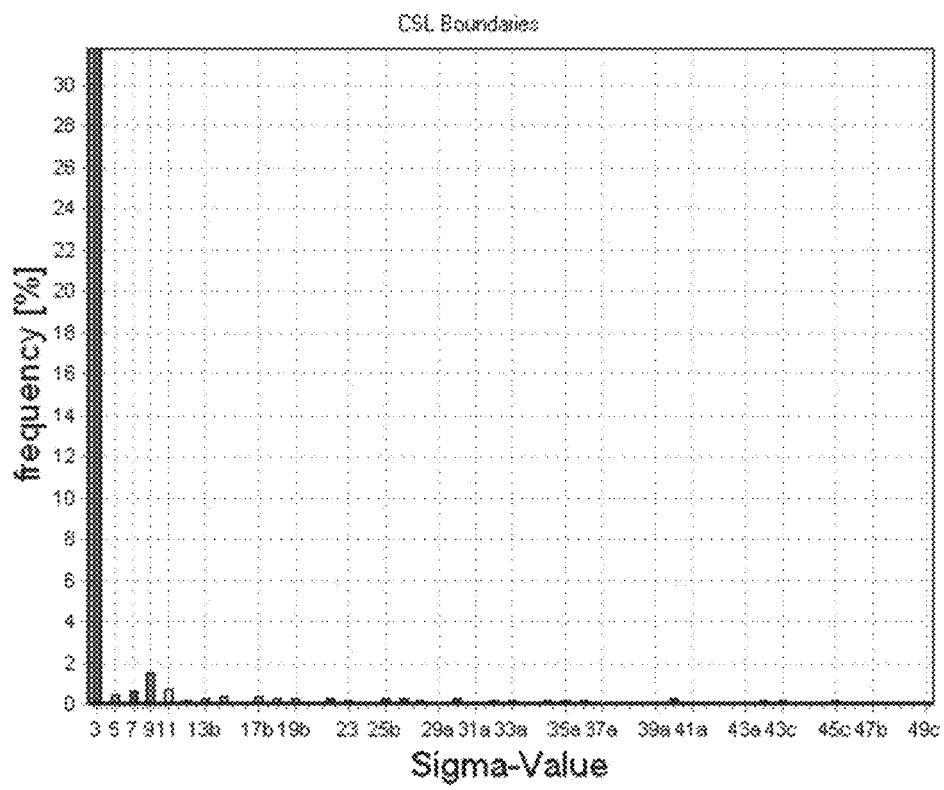
FIGS. 20A-20B illustrate the grain boundary orientations of untreated steel, and the grain boundary mis-orientation of laser surface melting-treated steel, according to an embodiment of the invention.
Figure 20B:
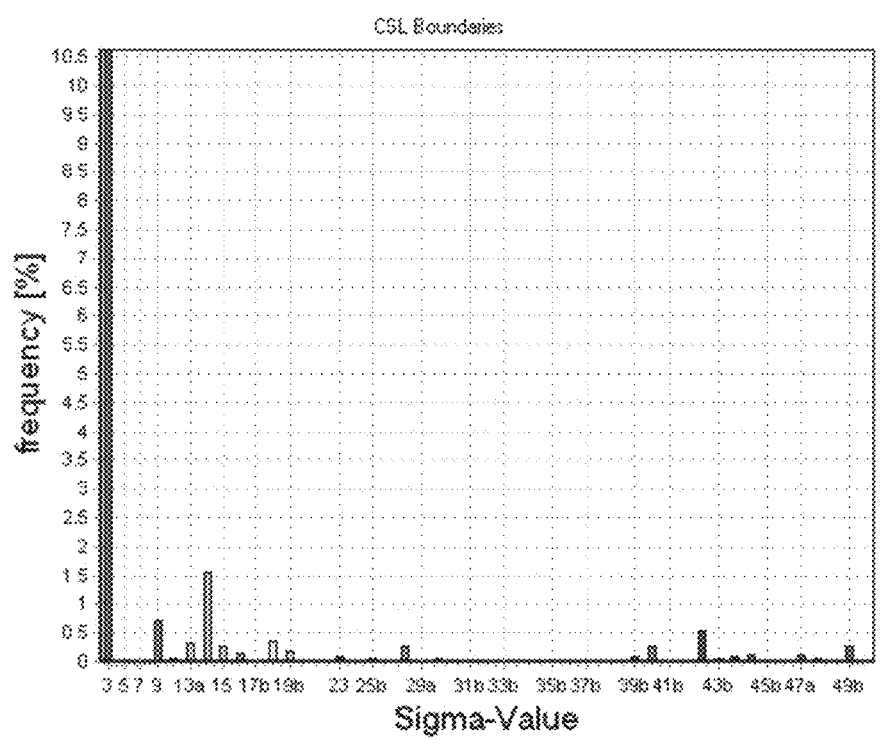
Figure 22A:
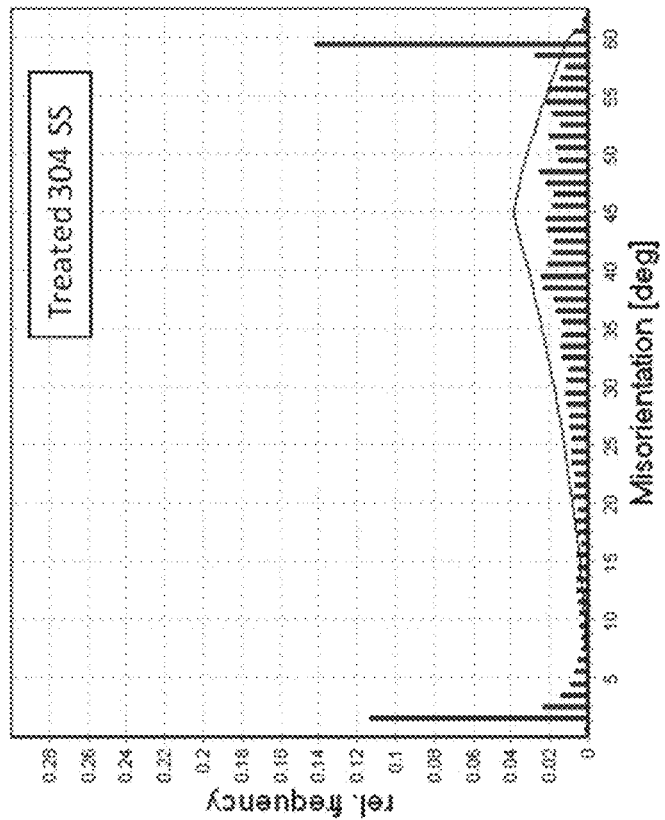
FIGS. 22A-22B illustrate grain boundary fraction measurements of untreated and laser surface melting-treated steel, according to an embodiment of the invention.
Figure 22B:
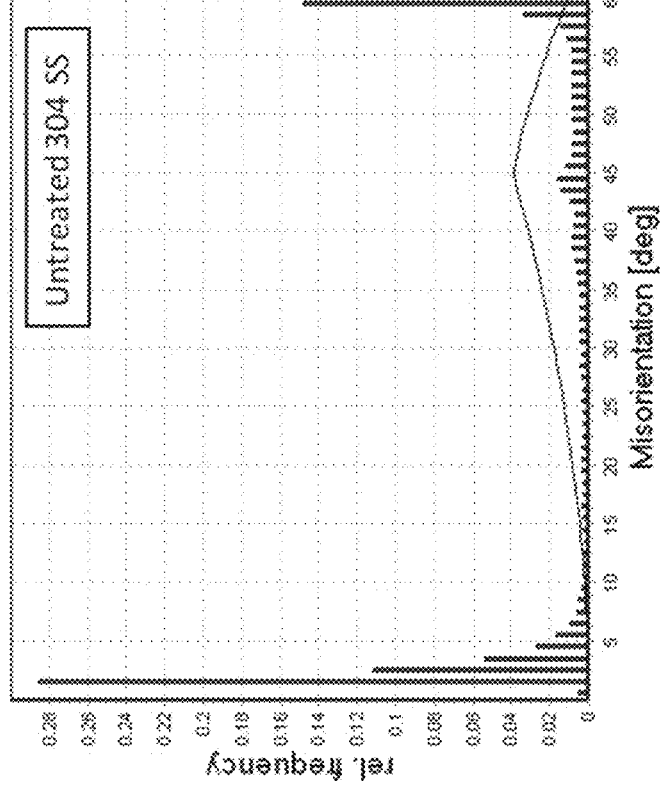

FIGS. 20A-20B illustrate grain boundary classification, and that laser surface melting introduces grain boundary misorientation, as depicted in FIG. 20B. FIGS. 22A-22B also illustrate grain boundary fraction measurement for LSM-treated samples (FIG. 22A) and untreated samples (FIG. 22B).

Figure 24:
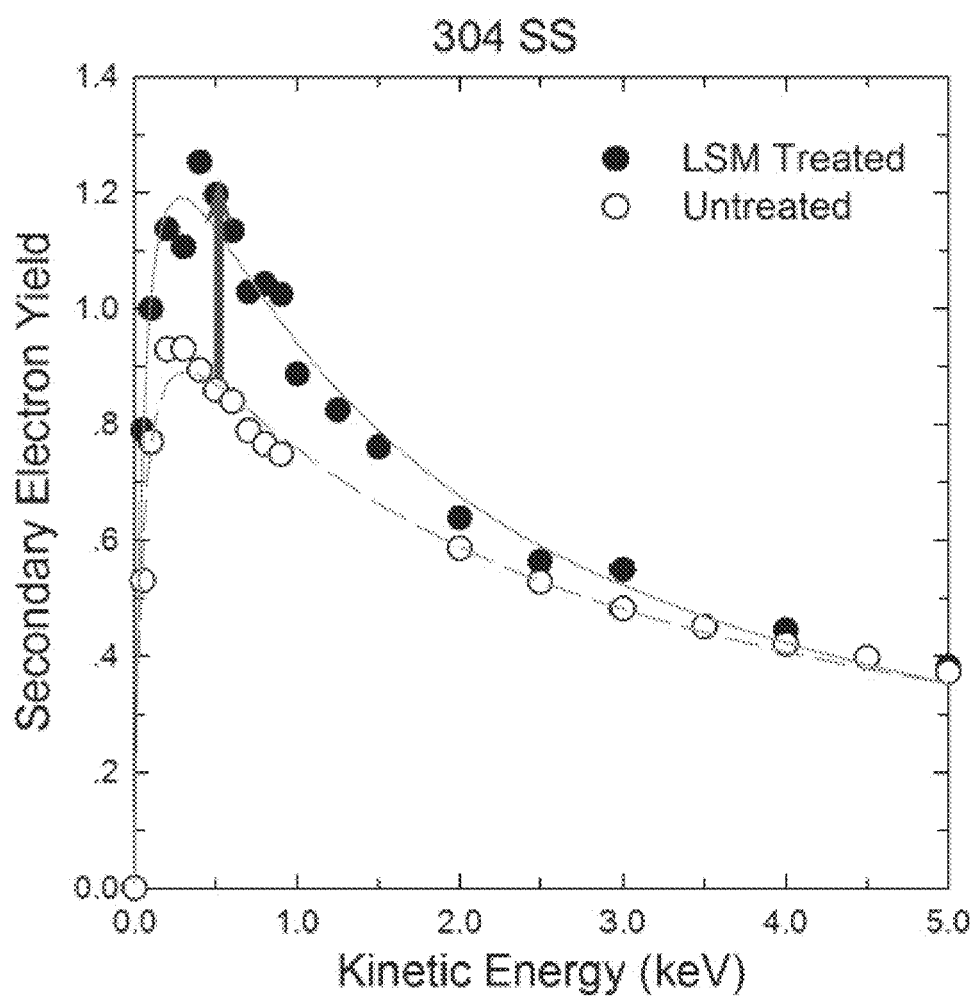
FIG. 24 illustrates the increase in secondary electron yield of steel after laser surface melting treatment, according to an embodiment of the invention.

FIG. 24 illustrates the measurable increase in secondary electron yield for LSM-treated metal samples.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

304SS treated with CW, non-polarized Yb fiber laser radiation at an ED value of 13.54 kJ/cm$^2$ showed reduced hydrogen outgassing by a factor of ~4 at an electron dose of 6×10$^{18}$ cm$^2$, indicating the feasibility of the LSM process for reducing hydrogen outgassing from SS anodes. Such laser treated anodes do not require post-processing to preserve the benefits of the treatment. The mechanism of suppression of hydrogen outgassing is caused by stimulating grain growth in the lattice of the specimen. Hydrogen outgassing reduction may be maximized via grain boundary character distribution as a function of the laser spot size and energy density.

Commercial applications include but are not limited to: LSM of steel chambers for ultra/extreme high vacuum systems (particle accelerators, etc.), analytical techniques (XPS, SIMS, SEM, FIB, etc.). LSM may also be used for the reduction of hydrogen embrittlement for mechanical failures in metals for increased strength of structural metals.

Experimental

SPI™ G3 Yb non-polarized fiber laser, wavelength 1.064 μm, an output beam M2=2 and maximum output power of 20 W in continuous wave (CW) mode was used for melting the surface of 3 mm and 0.6 mm thick 304 SS plates. The lens used was a Jenoptic™ 03-90FT fused silica lens, with focal length of 125 mm. The samples were processed at room temperature with a continuous flow of nitrogen supplied into the capped stage to minimize the sample's oxidation. Greisenger™ GOX 100T oxygen meter was used to track the oxygen levels to 0.1-0.2% in the capped stage. Ethanol was used to clean/remove contaminants from the sample's surface prior to laser processing. For characterization, an Olympus BX51 optical microscope with Jenoptic™ ProgRes C10+CCD camera was used to record optical images of the laser penetration depth, where chemical etching was used to contrast the laser affected area. Chemical composition of the etchants was 10 g FeCl$_3$, 30 ml HCl, 120 ml water. For characterizing the grain boundaries an FEI/Philips™ XL30 scanning electron microscope (SEM) with electron backscatter diffraction (EBSD) analysis capability was used. Visual representation of the grains was generated by the HKLTango™ software in a form of combined three-angle Euler maps for a three-dimensional representation of the samples' crystal lattices. The hydrogen outgassing testing was done with the help of Anode Materials Characterization System (AMCS), a high vacuum system where a beam of electrons impacts the tested anode at normal incidence. A 50 keV electron beam 1.6 mm in diameter at 60 second intervals was used. An SRS™ RGA100 residual gas analyzer detected the outgassed elements from the samples. The electron current density at the sample surface was approximately 16.4 mA/cm$^2$ at base pressure of 5×10$^{-10}$ Torr.

Results

The 304 SS was processed by raster scanning the CW laser beam across the surface in a uniform pattern, according to the parameters presented in Table 2.

TABLE 2

| Laser parameters. | |
| --- | --- |
| Scanning velocity (mm/s) | 2.25 |
| Output power (W) | 12, 17 |
| Spot size diameter (μm) | 39.4 |
| Hatch spacing (mm) | 0.03 |

Figure 15A:
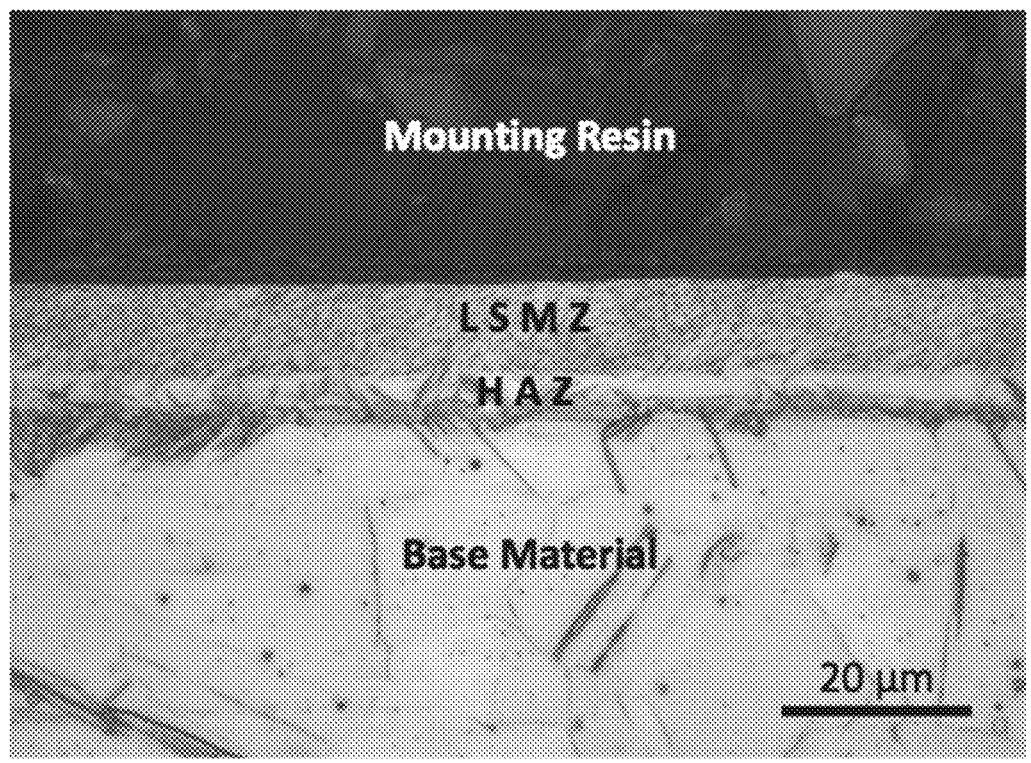
FIGS. 15A-15B illustrate optical images of a sectional view of raster-scanned samples of 304 stainless steel, according to an embodiment of the invention.
Figure 15B:
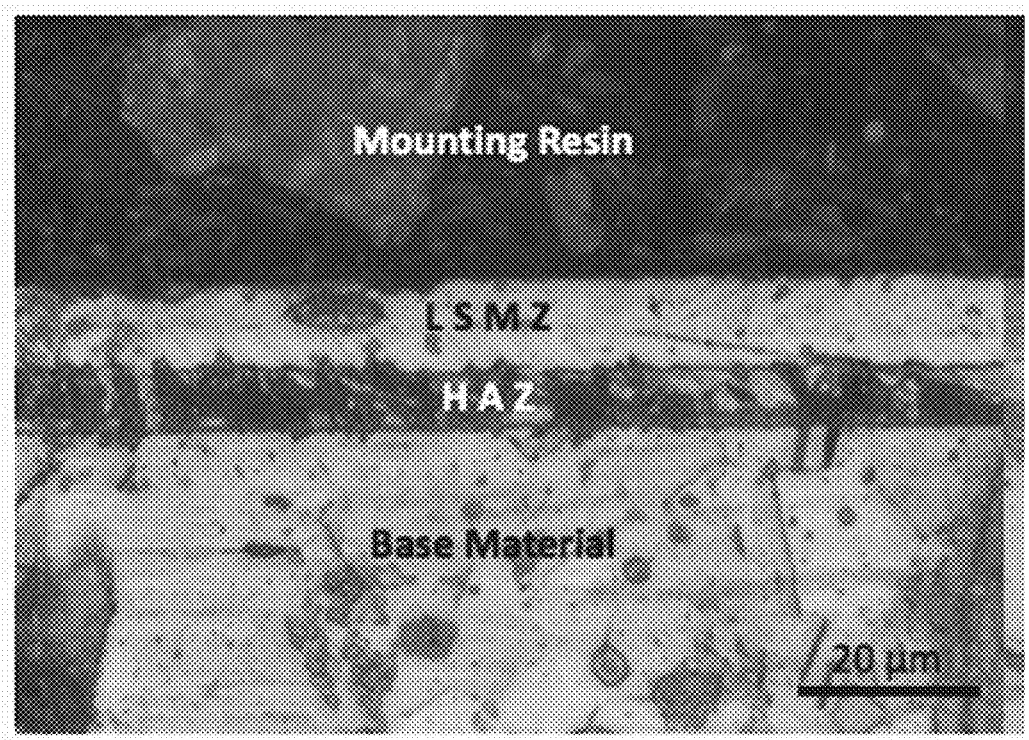

FIGS. 15A-15B depict longitudinal cross-section views of the of treated SS samples 3 mm and 0.6 mm thick, respectively, where the treated region is comprised of a laser surface melted zone (LSMZ) and heat-affected zone (HAZ). The depth of the LSMZ for the 3 mm sample (FIG. 15A) treated with 13.54 kJ/cm$^2$ laser energy density is approximately 9.7 μm; the 0.6 mm sample (FIG. 15B) was treated with 19.17 kJ/cm$^2$ and the LSMZ is ~11 μm.

FIGS. 16A-16B depict three-angle Euler maps of the untreated (FIG. 16A) and treated (FIG. 16B) samples, demonstrating the microstructural changes induced by 13.54 kJ/cm$^2$ laser energy density inside the LSMZ of the 3 mm SS sample. It can be observed that the grains in the laser treated sample, FIG. 16B, are elongated in the direction of the laser scan and have increased in size; per 0.12 mm$^2$ area of the sample's surface the number of grains was reduced from 1020 to 617 with some grains growing from 40 to 3,516 μm$^2$, indicating abnormal grain growth, as presented in Table 3.

The 0.6 mm SS sample is noted to have smaller average grain size compared to that of 3 mm SS sample, as presented in Table 3. The treatment of 0.6 mm sample (FIGS. 17A-17B) with laser energy density of 19.17 kJ/cm$^2$ demonstrated a further increase in grain elongation and size. The number of grains was reduced from 1,083 to 96 per 0.17 mm$^2$ surface area. Some grains reached 12,040 μm$^2$ in area, also indicating abnormal grain growth, as presented in Table 3.

TABLE 3

| Grain measurements showing average grain size and range for untreated and treated 304 SS | | | | |
| --- | --- | --- | --- | --- |
| | 3 mm sample, 0.12 mm$^2$ surface area | | 0.6 mm sample, 0.17 mm$^2$ surface area | |
| Grain Area | Untreated | Treated | Untreated | Treated |
| Average (μm$^2$) | 99.88 | 201.59 | 73.53 | 1756.17 |
| Minimum (μm$^2$) | 40.00 | 40.00 | 40.00 | 40.00 |
| Maximum (μm$^2$) | 628.00 | 3516.00 | 464.00 | 12040.00 |

The abnormal grain growth may be attributed to the laser scanning strategy. Grain nucleation appears to have little dependency on original grain size, regulated only by laser power, spot size, speed, and hatch spacing. Larger laser energy density prompted higher melting temperatures per same surface area of the sample, causing the grains to merge and grow at the expense of the neighboring grains. In terms of types of grains and GBs obtained, both treated samples exhibit a reduction in the fraction of GBs, as presented in Table 4.

TABLE 4

Grain boundary classification for untreated and treated 304 SS

| Sigma Value | 3 mm sample, 0.12 mm² surface area | | 0.6 mm sample, 0.17 mm² surface area | |
|---|---|---|---|---|
| | Untreated | Treated | Untreated | Treated |
| Σ 3 (%) | 33.81 | 15.39 | 30.40 | 9.49 |
| 3 ≤ Σ ≤ 29 (%) | 35.11 | 16.66 | 32.00 | 10.31 |
| 29 < Σ ≤ 49 (%) | 0.07 | 0.05 | 0.08 | 0.05 |
| Total Σ (3-49) (%) | 35.19 | 16.71 | 32.08 | 10.37 |

The measured GB reduction is largely in the dominant Σ3 boundaries. The total number of measured GBs was reduced by 18.47% per 0.12 mm² for the 3 mm samples and 21.72% per 0.17 mm² for the 0.6 mm SS samples, which indicates the benefit of increased laser energy density for LSM grain boundary reduction. FIG. 14 illustrates hydrogen outgassing results of the 3 mm SS sample. The results are presented as the change in hydrogen atom partial pressure above baseline with electron dose. An incubation period is observed between the electron dose of 0 to $\sim 3 \times 10^{18}$ cm$^{-2}$. In this period the atomic hydrogen diffusion is impeded due to sample's heating until its recombination at the surface of the sample into hydrogen molecules for surface desorption. The laser-treated sample exhibits a smaller slope, suggesting a lower rate of diffusion of atomic hydrogen to the surface because of the decreased number of grain boundaries. From the GB characterization results obtained for 0.6 mm SS sample, it is expected that the hydrogen outgassing testing of 304 SS treated with 19.17 kJ/cm² or higher average laser energy density should show further hydrogen outgassing reduction.

It is demonstrated that laser melting the surface of 304 stainless steel reduces its hydrogen diffusion via grain growth. The measured grain size in a 3 mm SS sample per 0.12 mm² surface area counted 40-3,516 μm² maximum increase; for a 0.6 mm SS sample 40-12,040 μm² per 0.17 mm². The 3 mm SS sample was bombarded with 50 keV electron beam and showed a factor of ~4 hydrogen outgassing reduction compared to untreated 3 mm SS sample. This is attributed to the decrease by 18.47% in the measured grain boundary count.

The results of hydrogen outgassing testing of 304 stainless steel with electron bombardment yielded several beneficial pieces of information, including: (1) grain elongation observed in the direction of laser scan; laser energy density affects grain size; laser surface melting introduces grain boundary misorientation; and hydrogen outgassing is dramatically reduced for laser surface melted 304 stainless steel.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method for reducing outgassing from a metal surface comprising:
   applying energy from an energy source to the metal surface sufficient to melt the metal surface; and
   allowing the metal surface to re-solidify, wherein the re-solidified metal surface comprises larger grains and fewer grain boundaries, reducing outgassing sites for a trapped gas, wherein the energy source is a laser, wherein applying energy from an energy source is performed in a raster scan pattern without overlap, wherein a spot size and applied energy of the laser energy source applied to the metal surface is sufficient to melt the entire metal surface, wherein the metal surface comprises at least one of scandium, vanadium, cobalt, copper, yttrium, zirconium, technetium, ruthenium, rhodium, palladium, silver, hafnium, tantalum, tungsten, rhenium, osmium, iridium, platinum, gold, lanthanum, cerium, praseodymium, neodymium, actinium, thorium, protactinium, uranium, and combinations thereof.

2. The method for reducing outgassing from a metal surface of claim 1, wherein the application of energy from an energy source releases at least some of a gas trapped in the metal.

3. The method for reducing outgassing from a metal surface of claim 1, wherein the trapped gas is atomic hydrogen.

4. The method for reducing outgassing from a metal surface of claim 1, wherein the metal surface is a part of an electrode of a high power system device.

5. The method for reducing outgassing from a metal surface of claim 1, wherein the metal surface is in one of a high-vacuum environment and a vacuum electronic device.

* * * * *